(12) United States Patent
Wilbur et al.

(10) Patent No.: US 7,615,129 B2
(45) Date of Patent: Nov. 10, 2009

(54) STRUCTURAL DAMAGE REPAIR ELEMENTS AND KIT

(75) Inventors: Wesley Scott Wilbur, Norton Shores, MI (US); David Kip Wilbur, Nunica, MI (US)

(73) Assignee: Scoda America, Inc., Muskegon, MI (US)

( * ) Notice: Subject to any disclaimer, the term of this patent is extended or adjusted under 35 U.S.C. 154(b) by 616 days.

(21) Appl. No.: 11/317,314

(22) Filed: Dec. 23, 2005

(65) Prior Publication Data

US 2007/0062630 A1 Mar. 22, 2007

Related U.S. Application Data

(63) Continuation-in-part of application No. PCT/US2005/011171, filed on Apr. 1, 2005.

(60) Provisional application No. 60/558,468, filed on Apr. 1, 2004, provisional application No. 60/638,646, filed on Dec. 23, 2004.

(51) Int. Cl.
 *B32B 37/00* (2006.01)
(52) U.S. Cl. .............. 156/94; 156/98; 156/293
(58) Field of Classification Search .......... 156/94, 156/98, 293, 294; 473/560, 561
 See application file for complete search history.

(56) References Cited

U.S. PATENT DOCUMENTS

| 3,389,046 A | 6/1968 | Burress |
| 3,638,942 A | 2/1972 | Bassett |
| 3,878,012 A | 4/1975 | Williams |
| 3,934,875 A | 1/1976 | Easton et al. |
| 4,086,115 A | 4/1978 | Sweet, Jr. et al. |
| 4,630,959 A | 12/1986 | Glaser |
| 4,855,173 A | 8/1989 | Dore |
| 4,905,441 A | 3/1990 | Landers |
| 5,125,147 A | 6/1992 | Hickham |
| 5,217,221 A * | 6/1993 | Baum .............. 473/561 |
| 5,607,154 A | 3/1997 | Meumann et al. |
| 5,943,767 A * | 8/1999 | Milam .............. 29/800 |
| 5,951,418 A | 9/1999 | Atkinson |
| 6,001,035 A | 12/1999 | Roberts |
| 6,254,301 B1 | 7/2001 | Hatch |
| 6,355,203 B1 | 3/2002 | Charmes et al. |
| 6,413,458 B1 | 7/2002 | Pearce |
| 6,824,847 B2 | 11/2004 | Mariaggi et al. |
| 7,108,618 B2 * | 9/2006 | Frischmon et al. .......... 473/560 |

OTHER PUBLICATIONS

Canadian Intellecutal Property Office, Communication dated Apr. 1, 2009 (1 page).

* cited by examiner

*Primary Examiner*—Jeff H Aftergut
(74) *Attorney, Agent, or Firm*—Flynn, Thiel, Boutell & Tanis, P.C.

(57) ABSTRACT

Structural damage repair elements including inserts and a structural damage repair kit is provided. The structural damage repair elements typically include two or more layers of materials having an adhesive therebetween that are subsequently compressed together. The structural damage repair kit includes a chemical molding agent, an optional jig, one or more structural damage repair elements and a sealant. Both hollow and solid elongated objects, as well as relatively flat, curved objects may be repaired with the kit. The structural damage repair elements include rods, wafers, and/or adhesive saturated inserts.

20 Claims, 19 Drawing Sheets

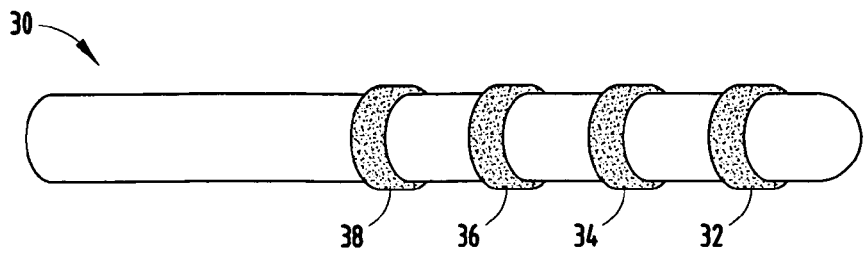
FIG. 9
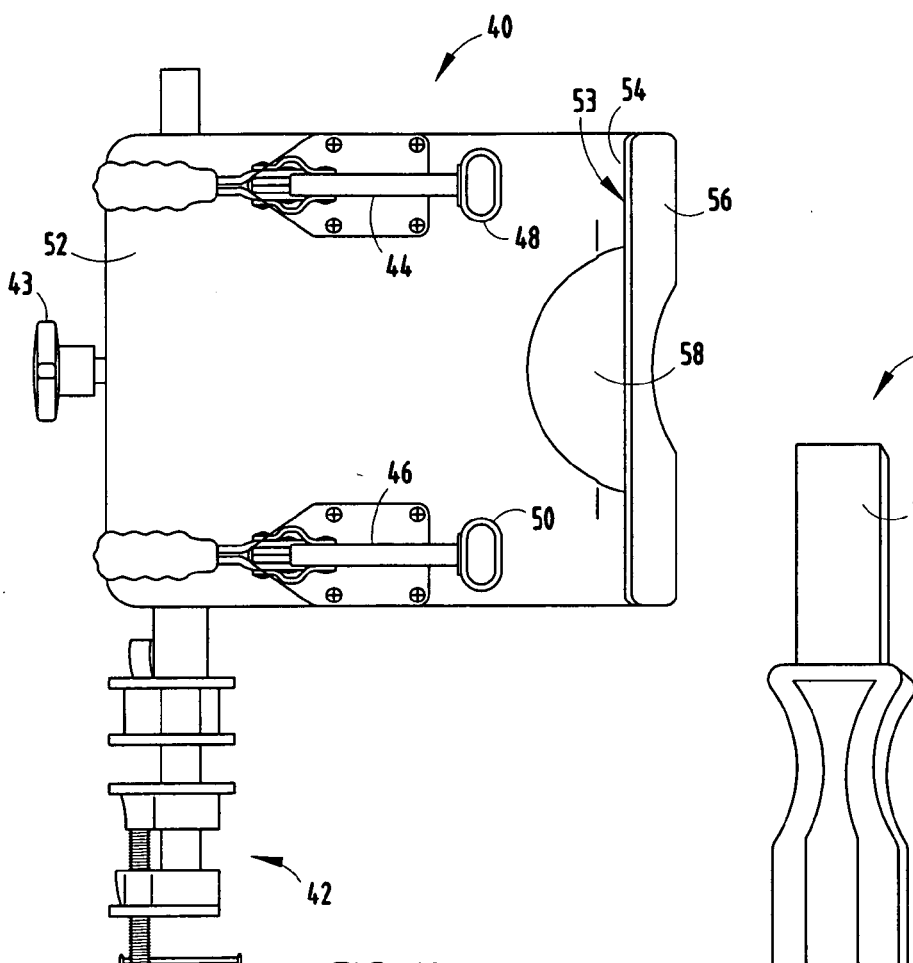
FIG. 10
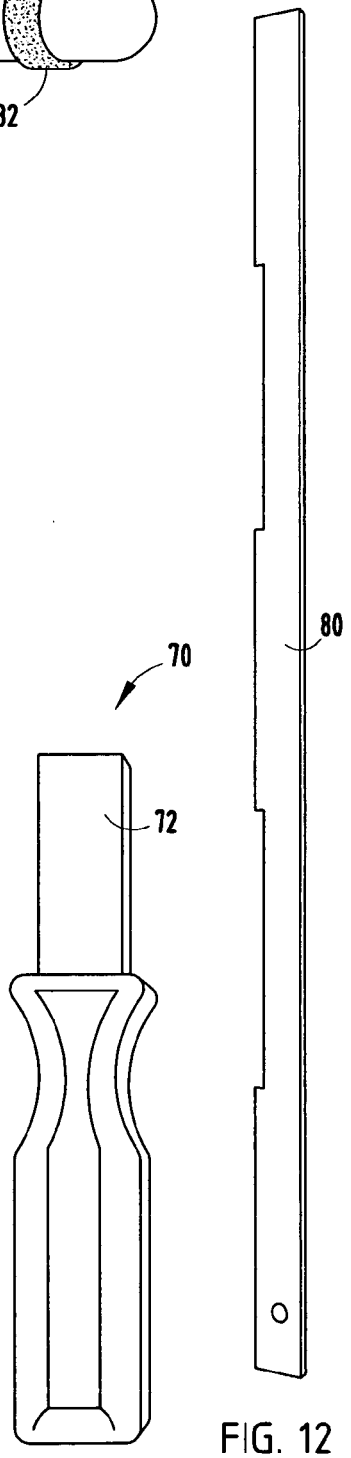
FIG. 11
FIG. 12

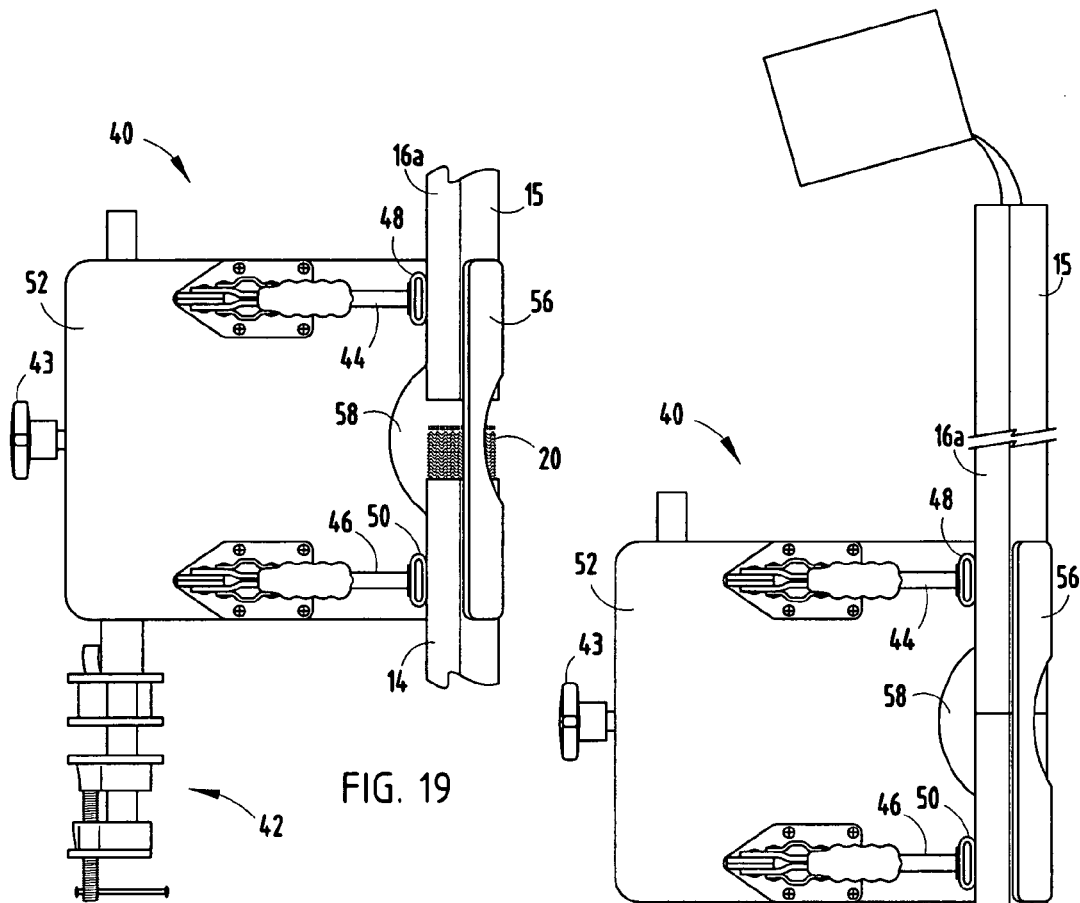
FIG. 19
FIG. 20
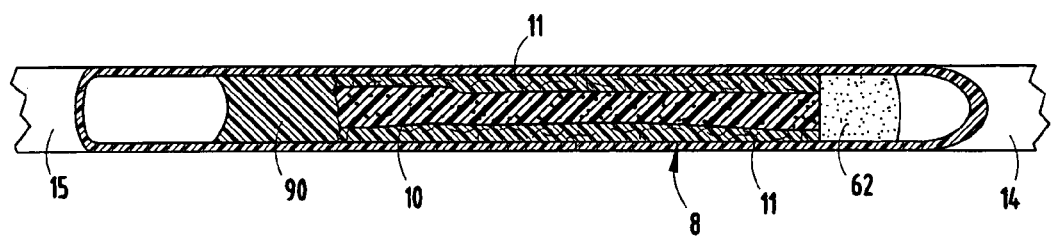
FIG. 21

STRUCTURAL DAMAGE REPAIR ELEMENTS AND KIT

CROSS REFERENCE TO RELATED APPLICATIONS

This application is a continuation-in-part of co-assigned PCT application Ser. No. PCT/US2005/011171, filed Apr. 1, 2005, entitled SUPPORT SYSTEM FOR A SINGLE- OR MULTI-PIECE HOLLOW OBJECT, which in turn claims benefit of provisional application Ser. No. 60/558,468, filed Apr. 1, 2004, entitled SUPPORT SYSTEM FOR A SINGULAR OR MULTI-PIECE HOLLOW OBJECT. This application also claims priority to provisional application Ser. No. 60/638,646, filed Dec. 23, 2004, entitled STRUCTURAL DAMAGE REPAIR ELEMENTS AND KIT. PCT application Serial No. PCT/US2005/011171 and provisional application Ser. No. 60/638,646 are incorporated herein by reference in their entirety.

BACKGROUND OF THE INVENTION

Objects comprised of or coated with fiberglass, carbon fiber, wood, etc. may develop or incur surface fractures or through-fractures. Surface fractures are typically breaks, cracks, splits, etc., that occur or develop in the surface of an object, but do not extend entirely through the wall of an object (i.e., a hockey stick (shaft, hozel, or blade), a boat hull, etc.). Through-fractures are those breaks, cracks, splits, etc. that extend entirely through the wall of an object.

Conventional repair kits and methods of repair generally involve removing the fractured section altogether, replacing the fractured section and/or repairing the fracture. However, these kits and methods compromise the structural integrity of the object to be repaired because the repair does not restore and/or enhance the structural integrity of the repaired object, but rather, either creates one or more shear points where the replaced or repaired material contacts the original material or provides a temporary repair that is weaker than the original material. These conventional repair kits and methods of repair compromise the repaired section of the object and potentially compromise the safety of the person(s) using the repaired object. Additionally, these conventional repair kits and methods of repair are very costly, very labor intensive, and can drastically alter the appearance or performance of the repaired area.

In addition, objects made or formed from hollow support pieces and/or objects typically do not provide similar strength and support as compared to the same objects which are made of the same materials, but are solid in design and not hollow. However, hollow formed objects offer many advantages over solid formed objects including, but not limited to, hollow formed objects typically use less overall material and therefore are lighter in weight, more maneuverable and easier to transport. Additionally, because less material is used in the construction of hollow objects, these hollow objects typically cost less money to produce.

While objects that are hollow offer the above advantages, these hollow objects, when in use, may undergo sudden impact or extreme flexural stress, and may also undergo structural stress with use over time. Therefore, these hollow objects may develop fissures, develop cracks and/or fracture into multiple pieces. Once the hollow object is cracked or fractured, replacing the cracked section of the object, or completely replacing the fractured section of an object may either be very costly, or in many cases, not possible. In order to obtain a hollow object that is comparable in support and strength to the original uncracked or unfractured hollow object, a user is left with either purchasing, if possible and if available, a new hollow piece to replace the cracked or fractured piece of the object, or the user must replace the entire object all together. Both of these options are very costly and may take significant amounts of time.

Accordingly, there is a need for structural damage repair kits that provide great strength and yet are cost-effective. These elements and the kit should restore and/or enhance the structural integrity of fractured objects, reduce any potential shear points and typically cost much less than conventional repair kits and are much less labor intensive than conventional repair kits and methods.

SUMMARY OF THE INVENTION

The present invention comprises external structural damage repair elements and may comprise a structural damage repair kit including an adhesive or molding agent (hereinafter referred to as "adhesive"), reinforcing members and one or more sleeves. These elements (and use of the kit) restore and/or enhance the structural integrity of fractured objects, reduce any potential shear points, typically cost much less than conventional repair kits, and are much less labor intensive than conventional repair kits and methods. Also, the structural damage repair elements of the present invention may be used with any type of fracture and are not limited to just surface fractures or through-fractures.

One aspect of the present invention includes a repair kit for hollow objects. The repair kit includes an insert comprised of at least one inner section and at least one layer of material at least partially covering the inner section and a liquid hardening system.

Another aspect of the present invention includes a method of repairing a hollow object. The method includes the steps of providing a first hollow piece of an object and a second hollow piece of an object and providing an insert, at least a portion of which is a material external of a center section of the insert. In addition, the insert is positioned into the first hollow piece and positioned into the second hollow piece. A liquid hardening system is inserted into one of the hollow pieces to contact the insert.

Yet another aspect of the present invention includes a hockey stick repair kit including an insert comprised of at least one center section and at least one layer of material at least partially covering the center section. The kit also includes a stopper, a liquid hardening system, and a bracket system.

Still another aspect of the present invention includes a method of repairing a hollow object. The method includes providing a first hollow piece of an object and a second hollow piece of an object and providing an insert, at least a portion of which is a material external of a center section of the insert. A bracket system is provided for holding the first hollow piece and second hollow piece in place. The first hollow piece and the second hollow piece are inserted into the bracket system and the first hollow piece is aligned with the second hollow piece. The insert is positioned in the first hollow piece and also positioned in the second hollow piece. A hardening system is then inserted in one of the hollow pieces to contact the insert.

Yet another aspect of the present invention includes a structural strength enhancing insert comprising one or more layers of reinforcing fabric. An adhesive is disposed between each layer of reinforcing fabric and the layers are subsequently compressed together to form a structural strength enhancing member.

Another aspect of the present invention includes a method of repairing an object using a structural damage repair kit including providing one or more structural strength enhancing members and an adhesive. The object shaped to a desired shape. Grooves are created in the area of the object to be repaired and one or more structural strength enhancing members are inserted into each of the grooves. An adhesive is applied to the object adjacent the structural enhancing members and excess adhesive is removed from the object.

Yet another aspect of the present invention includes a method of repairing a hollow object. The method includes removing a damaged portion of the hollow object and inserting a foam plug into the hollow object. Also, a plurality of reinforcing members are inserted into the hollow object. An adhesive is applied over the reinforcing members.

Another aspect of the present invention includes a method of repairing a hollow object, including providing an object with a first hollow portion and a second hollow portion, the first hollow portion having a first end. A plug is inserted into the first end of the first hollow portion and a plurality of reinforcing members are inserted into the first hollow portion, adjacent the plug. The reinforcing members are positioned so that the reinforcing members extend beyond the first end of the first hollow object. The second hollow portion is placed over the reinforcing members to abut the first hollow portion, and adhesive is inserted into the second hollow portion into contact with the reinforcing members.

A method of repairing an object using a structural damage repair kit including providing one or more structural strength enhancing members, and an adhesive. The object is shaped to a desired shape and grooves are created in the area of the object to be repaired. One or more structural strength enhancing members are inserted into each of the grooves and adhesive is applied to the object adjacent the structural enhancing members. In addition, excess adhesive is removed from the object.

These and other features, advantages, and objects of the present invention will be further understood and appreciated by those skilled in the art by reference to the following specification, claims, and appended drawings.

BRIEF DESCRIPTION OF THE DRAWINGS

FIG. 9 is side perspective view of a grooving bit;

FIG. 10 is a front elevational view of a bracket system;

FIG. 11 is a front elevational view of an insertion tool;

FIG. 12 is an alignment guide;

FIG. 19 is the bracket system of FIG. 10 with a broken shaft and an insert inside the broken shaft;

FIG. 20 is the bracket system of FIG. 10 with a reconnected broken shaft and adhesive;

FIG. 21 is a partial cross-sectional elevational view of a shaft with an internal insert;

DETAILED DESCRIPTION OF PREFERRED EMBODIMENT

Figure 1:
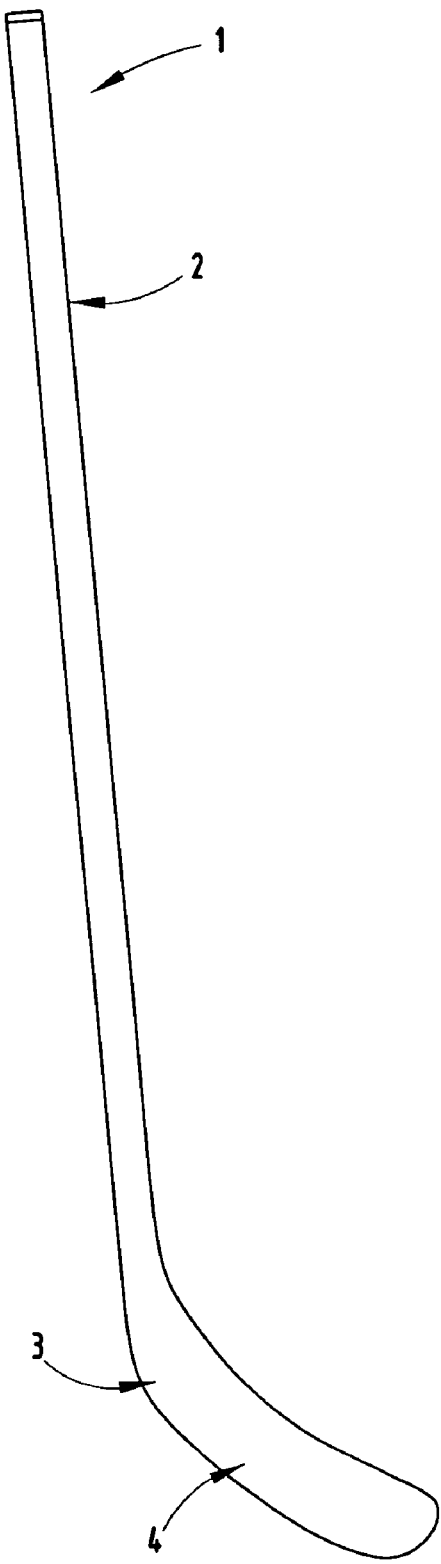
FIG. 1 is an elevational view of a hockey stick upon which an embodiment of the present invention could be incorporated.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings and/or photographs and described in the following specification are exemplary embodiments of the inventive concepts defined in the appended claims. Hence, specific dimensions and other physical characteristics relating to the embodiments disclosed herein are not to be considered as limiting, unless the claims expressly state otherwise. The term "hollow" is not meant to be limited by any shape of the given object, but instead refers to an object having an unfilled space within. However, the present invention could also be used on products which are not entirely tubular, or are not completely enclosed on one side.

Referring to FIG. 1, reference numeral 1 generally designates a hockey stick embodying the present invention. The hockey stick 1 includes a shaft 2, hozel 3, and blade 4. The shaft may have a solid or hollow construction and may be of varying lengths. The hozel 3 and blade 4 may also be of varying sizes and angles.

Figure 2:
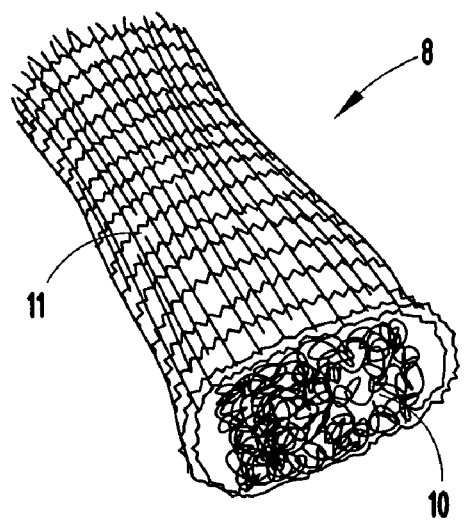
FIG. 2 is a perspective view of an insert.

Referring to FIG. 2, insert 8 of the preferred embodiment includes a porous substance, such as a foam, or otherwise solid center section 10 and a fabric 11 covering at least a portion of the center section 10. The center section 10 may be any type of open-cell or closed-cell foam, depending upon the porosity desired. The foam is at least partially surrounded by at least one layer of a fabric or cloth 11. This configuration of at least one center section 10 surrounded by at least one layer of fabric or cloth 11 is hereinafter referred to as insert 8. Fabric 11 of insert 8 may be secured at two opposing ends (top end and bottom end) of insert 8. Securing devices (not shown) can be used to prevent the unraveling of the fabric. Such securing devices may include common hot melt adhesives, zip ties, rubber bands, tape, and the like. Preferably, however, a rubber cement is used to stabilize the ends of the fabric sleeving. Use of rubber cement also allows compression and decompression of insert 8.

Center section 10 is preferably porous enough to allow a liquid hardening system discussed below, such as an epoxy or adhesive 9, to flow through it. Typically, open-cell foam is preferred over closed-cell foam due to the greater porosity provided by open-cell foams, although a closed-cell foam may be used with the present invention. As used herein, "open-cell" foams include what are sometimes referred to as "open pore" foams. This greater porosity allows liquid hardening systems to be absorbed into the pores and completely saturate and fill the pores. The greater porosity also causes the liquid hardening system to reach the fabric 11 quickly. This allows maximum time to wet out and saturate fabric 11 and the grooves in the side walls of a hollow object 13, as described below. A liquid hardening system absorbed into the cells of an open-cell foam typically provides a stronger center section as compared to an open-cell foam without a liquid hardening system absorbed therein. In open-cell foam, the cell walls, or surfaces of the cell bubbles, are broken and air fills these spaces in the material. Therefore, when a liquid hardening system is introduced to an open-cell foam, the liquid hardening system fills at least some of the broken or air-filled cell bubbles.

Alternatively, when a closed-cell foam is used as center section 10, the liquid hardening system essentially coats the closed-cell foam center section creating an internal chamber of closed-cell foam. In closed-cell foams, most of the cells or bubbles in the foam are not broken, and thereby the closed-cell foam may not absorb or become saturated with much of the liquid hardening system like an open-cell foam. When utilized as center section 10, closed-cell foam typically has varying degrees of hardness, depending upon its density. Also, the use of closed-cell foams as center section 10 may also result in a lighter center section 10 because the closed-cell foams do not absorb as much of the liquid hardening system.

When either an open-cell or closed-cell foam is utilized in insert 8, the foam may be in a shape according its intended use. The shape preference of insert 8 depends on the shape of the space insert 8 is to be inserted into. The foam center section 10 enhances the ability of the insert 8 to be customized to any shape desired or required in use. The foam may be comprised of any material, including, but not limited to, polyvinyl chloride (PVC), polystyrene (PS), polyurethane (PU), polymethacrylamide, polyetherimide (PEI), styreneacrylonitrile (SAN), polyethylene (PE), man-made honeycomb, or any combinations or any derivations of any of the above. These foams may be crosslinked, uncrosslinked and/or laminated foams. Reticulated polyurethane foams are typically preferred. An example of such a reticulated polyurethane foam is FilterCrest™ T-20 "open pore" foam from Crest Foam Industries, Inc., of Moonachie, N.J.

Alternatively, insert 8 of the present invention may not contain a foam center section, but instead contain other materials as center section 10, including, but not limited to, wood, plastic, metal, or any derivations or combinations of any of the above. Section 10 may be made of any object which forces fabric 11 to the wall of the hollow object 13 by rebound action or inflation, including but not limited to balloons, torsion arms, springs, foaming, expanding compounds, and inflatable devices. When any of these materials are used as the center section of insert 8, these materials essentially become an internal chamber having a liquid-hardening-system-coated fabric external layer. Also, when any of these materials are used as center section 10 of insert 8, these materials may be any shape according to the intended use of insert 8. Center section 10 may also be made of any of the materials above in combination with an open-cell or a closed-cell foam.

Insert 8 contains at least one layer of fabric or cloth 11 which at least partially covers center piece 10. The fabric or cloth 11 may include, but is not limited to, KEVLAR®, carbon fiber fabrics or materials, fiberglass, and/or any fabric capable of reinforcing a structure and/or enhancing performance of a structure when exposed to a liquid hardening system. Two layers of a biaxially-weaved carbon fiber sleeve is preferred. The amount of the fabric used depends on the shape and size of center section 10. Also, the shape of the fabric 11 typically conforms to the shape of the center section 10 which the fabric at least partially surrounds.

A liquid hardening system is utilized in the present invention to harden center section 10 and preferably fabric 11 surrounding center section 10. A single component or multicomponent liquid hardening system may be used in the present invention. Such a liquid hardening system may include, but is not limited to, a polyester resin system, an epoxy resin system, a urethane system, an acrylic system, hot melt adhesives, moisture cure epoxies, polymer systems, polyurea, polyurethane, bisphenol-A epoxy system, bisphenol-F epoxy system, a mercaptan-based epoxy system, a combination of a bisphenol-A and bisphenol-F system, or any other liquid hardening system or derivations and/or combinations of any liquid hardening system including, but not limited to those discussed above. Typically, a bisphenol-A epoxy system is preferred. When the liquid hardening system contacts center section 10 and the fabric 11 surrounding center section 10, fabric 11 may also be at least partially hardened thereby providing support for the hollow object 13 to which the insert is incorporated within. A "liquid hardening system" includes systems that dry, cure, or harden for any reason, including but not limited to, evaporation or chemical reaction.

Figure 3:
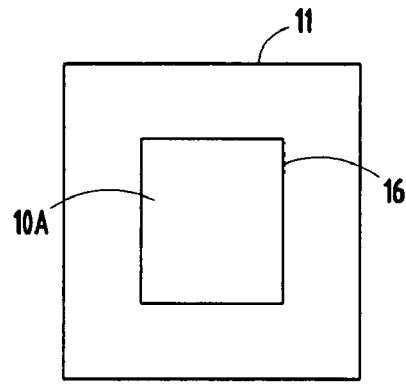
FIGS. 3-8 are cross-sectional views of various configurations of the insert of FIG. 2.
Figure 4:
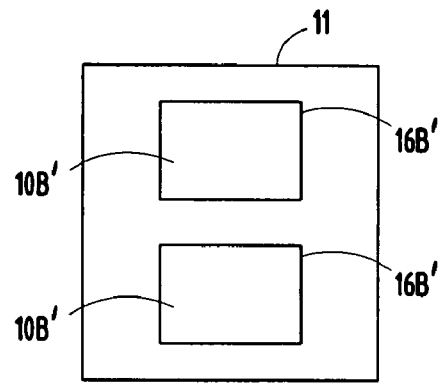
Figure 5:
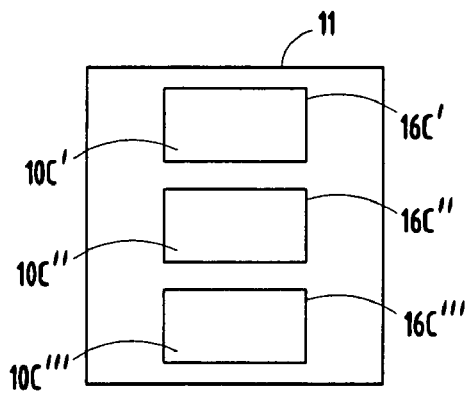
Figure 6:
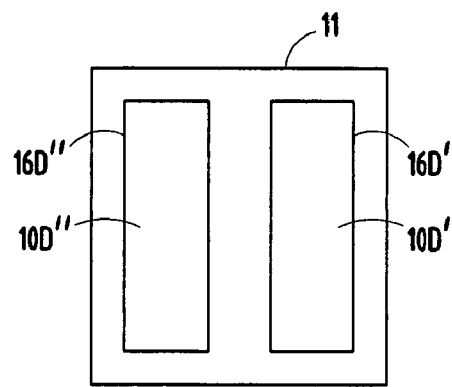
Figure 7:
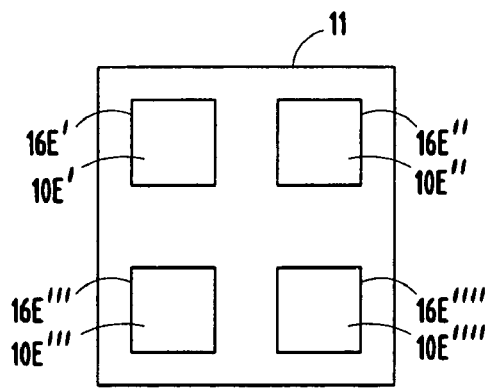
Figure 8:
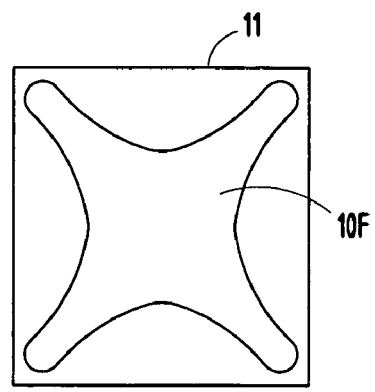

Insert 8 may take other configurations as well, depending on the size and shape of the hollow object 13 and the desired stiffness or flexibility of the resultant shaft, and desired weight of the insert 8. FIGS. 3-8 show a cross-sectional top view of various configurations of insert 8. Although FIGS. 3-8 depict the hollow object 13 as generally rectangular, the hollow object 13 may be many shapes, including round or oval. FIG. 3 shows an embodiment of insert 8 with an outer layer of fabric 11, and an inner fabric layer 16. Inside the inner fabric layer 16 is a center section 10A, which is preferably an open-cell foam. The embodiment of FIG. 4 has an outer layer of fabric 11 and two inner fabric layers 16B', 16B". Within each of the two inner fabric layers 16B', 16B" is a center section, denoted as 10B', and 10B", respectively. In FIG. 5, insert 8 has three center sections 10C', 10C", and 10C''', and surrounded by a fabric layer, 16C', 16C", and 16C''', respectively. Middle center section 10C" may be a less porous or non-porous foam, which provides structure, but helps reduce the weight of insert 8 because the liquid hardener will not penetrate, or will only penetrate minimally, middle center section 10C". The insert 8 of FIG. 6 is very similar to that shown in FIG. 4, but its center sections 10D' and 10D" are wider than those of FIG. 4. FIG. 7 shows an insert 8 with four center sections, 10E', 10E", 10E''', and 10E''''. Ultimately, the more center sections there are, the stiffer the insert 8, which may be preferred for certain hollow items. FIG. 8 shows another alternate design with a center section 10F, that is generally X-shaped and may be of extruded foam. Center section 10F may be porous or non-porous and coated or non-coated. This configuration allows for the liquid hardening system to flow more freely and quickly into the interior of the fabric layer 11.

A grooving bit 30, shown in FIG. 9, can be used in the repair of the hollow objects 13 such as composite hockey stick shafts. Grooving bit 30 has at least one raised grooving area for creating "locking" channels in the inside of the hollow object 13 to add strength and durability to the repaired object. Grooving bit 30 preferably has at least three raised grooving areas (although it is not necessary to have that many) and as shown in FIG. 9, grooving bit 30 more preferably has at least four raised grooving areas 32, 34, 36, 38 on its outer diameter. It may have more or less raised grooving areas, depending on the desires of the user and the object being repaired. Grooving bit 30 preferably is sized and shaped to fit in a high speed rotary device, such as a DREMEL® ADVANTAGE™ high speed rotary saw Model 9000.

The repair of hollow object 13 may include the use of a bracket system 40 (FIG. 10) that may be utilized in the repair of a single- or multi-piece object. Bracket system 40 is used for generally immobilizing a single- or multi-piece object while the liquid hardening system cures or dries. Bracket system 40 is in communication with at least one face of the single- or multi-piece object at least on each side of the fracture or break in the hollow object 13 (see FIG. 20). Bracket system 40 has a generally flat surface 52 and a receiving space 53, which is formed by sections 54 and 56, which are preferably at a 90° angle with respect to each other. The bracket system 40 preferably includes a clamp 42 so that a user may position the bracket system 40 on a work surface so that the hollow object 13 may be worked on at a more desired height. Clamp 42 is preferably adjustable vertically so it may be used at a comfortable position. This can be achieved by loosening knob 43, which allows adjustment of clamp 42. Bracket system 40 also preferably includes two tensioning devices 44, 46, each attached to surface 52, to apply an appropriate amount of tension to the single- or multi-piece hollow object 13 to immobilize and/or position the single- or multi-piece hollow object 13. Tensioning devices 44, 46 generally include soft, flexible bumpers 48, 50 to contact the hollow object 13 and immobilize it without damaging its structure. The use of flexible bumpers 48, 50 also allow the bracket system 40 to be used with different sized objects. The tensioning devices 44, 46 also preferably have a lock which holds the tensioning devices 44, 46 in a locked position. Bracket system 40 does not typically contact the face of the hollow object 13 in or around the crack or fracture in the hollow object 13. This allows a user to apply tape, wax, or any other type of adhesive 9 or sealant to the external surface of the hollow object 13. This is done around the break or fracture while the hollow object 13 is immobilized via an opening 58, and is placed there to prevent leakage of liquid at the joint where the two shaft halves meet.

In another embodiment of the present invention, a kit is provided which includes insert 8, a plug/stopper 62, a liquid hardening system and optionally an adhesive 9 tape and/or a wax based sealant for the shaft 2. The kit of the present invention may be utilized by the following steps as detailed below. A kit of the present invention may be utilized on any of the single- or multi-piece hollow objects 13 as previously discussed in this application.

In operation, the support system of the present invention may be used to repair a hollow stick. A hockey stick having a fracture therein, or a hockey stick 1 which has been completely broken into more than one piece, may be repaired by utilizing the support system of the present invention. In utilizing the support system of the present invention, the following steps may be performed (provided the hockey stick 1 is in more than one piece):

1. Make any stick surface repairs desired and remove the cap 16b (i.e., the cap at the non-blade end of the hockey stick 1) or the blade 4 if it is replaceable. The completely open end 16a will hereafter be referred to as the "pouring end" 16a and the partially closed end (or if also completely open, it will be sealed off by use of a plug/stopper 62 as described below) will hereafter be referred to as the "sealed end."

2. Cut the stick 1 to remove any damaged areas 20 in the repair joint area of the stick 1.

3. Remove any plastic sheeting or other material that may inhibit the liquid hardening system from contacting the inside surface of the hockey stick 1.

4. Sand or abrade the inside of both ends of the joining halves of the hockey stick 1. Sand up to about 2 inches from the joint.

5. Using grooving bit 30 in a power rotary device, such as a high speed rotary saw, ream grooves on the inside walls of both halves of the hockey stick 1 to enhance physical adhesion and remove any dust and loose debris from the inside of the shaft 2. Preferably, four grooves should be created, but more or less may be used.

6. Gently position a plug/stopper 62 into the sealed end (bottom half) 64 of the stick 1. Position the plug/stopper 62 down the hockey stick shaft 2 (i.e., the sealed end of the shaft 2). For most applications, the preferred position is 1-¾ inches down the stick of the shaft 2. The insertion tool 70 (see FIG. 11) may be used to insert the plug/stopper 62 to achieve the desired positioning. The end 72 of the insertion tool 70 is of a predetermined length that can motivate the plug/stopper 62 into the sealed end 64 the desired distance. Plug/stopper 62 is to hold the position of the insert 8 and/or rods 12 and to prevent the liquid hardening system from seeping to the bottom of the sealed end 64 of the stick 1 and thus from weighing the bottom of the stick 1 down. Plug/stopper 62 also keeps a user from improperly fixing the joint by starving the repair area of needed liquid hardening volumes (i.e., the liquid hardening system is kept in the area in and around the fracture area of the stick). Plug/stopper 62 is preferably made of a non-porous/closed-cell foam that is relatively springy so it will hold itself at the desired position inside the bottom half of the hockey stick 1, and not allow entry or seepage (or just a minimal amount) of the liquid hardening system.

7. Attach bracket system 40 onto a stable work surface using clamp 42.

8. Insert the sealed end 64 of the stick into bracket system 40, using tensioning device 46 to hold the shaft 2 in place. The top of the sealed end 64 is preferably centered with respect to the opening 58 of bracket system 40.

9. Using tensioning device 44, secure the pouring end 16*a* in the bracket system 40.

10. Using alignment guides 80 (FIG. 12), align or "shim" the sealed end 64 of the stick 1 with the pouring end 16*a* so that the two portions are properly aligned (vertically or otherwise). Alignment guides 80 are preferably long, substantially rigid structures. They may be straight or curved, depending on the shape of the hollow object 13. It is preferable to use two alignment guides 80 simultaneously to perform the alignment. If both ends of the stick 1 do not align properly as demonstrated through the use of alignment guides 80, either portion of the stick 1 may be adjusted slightly while in the bracket system 40 to achieve alignment.

11. Gently position insert 8 and/or rods 12 into the sealed end 64 of the hockey stick shaft 2. Position insert 8 and/or rods 12 down the hockey stick shaft 2 until insert 8 and/or rods 12 touch(es) the plug/stopper 62.

12. Position the pouring end 16*a* (i.e., handle portion) of the hockey stick 1 over insert 8.

13. Seal the external joint of the two stick ends with an adhesive 9 tape.

14. Mix the liquid hardening system and pour the liquid hardening system directly into the top of the pouring end 16*a* (see FIG. 8), down the shaft of the hockey stick 1. It is important that the liquid hardening system permeate, saturate, or otherwise contact insert 8 while the liquid hardening system is in its most liquid state. It is possible that the liquid hardening system could be inserted by other means such as injection from the side or top.

15. Keep the stick 1 in a straight upright secure position where it will not be disrupted for an extended period of time. Preferably, the stick 1 is left in the bracket system 40 for approximately 24 hours, but shorter or longer times are possible depending on the liquid hardening system employed. After removal of the stick 1 from the bracket system 40, it should not be flexed for an additional period of time, preferably 72 hours. The optimal times vary depending on the liquid hardening system used and the temperature of both the liquid hardening system and the shaft 2.

Not all of the foregoing steps are necessary to effectuate repair of a hockey stick or other hollow object 13, but are preferred. FIG. 21 shows the inside of a repaired hollow object 13 such as a hockey stick 1. The first hollow portion 14 and second hollow portion 15 are joined together with the aid of the insert 8. Some excess dried or cured hardening system 90 may accumulate above the insert 8, but is mostly consumed within center section 10 and fabric 11.

Figure 13:
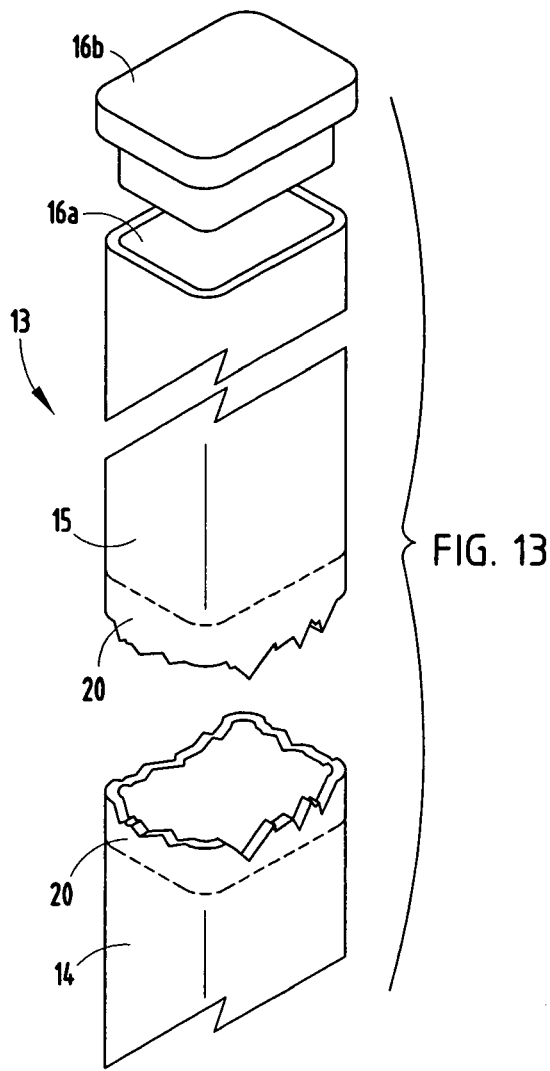
FIG. 13 is a partial exploded perspective view of a broken shaft of a hockey stick.
Figure 14:
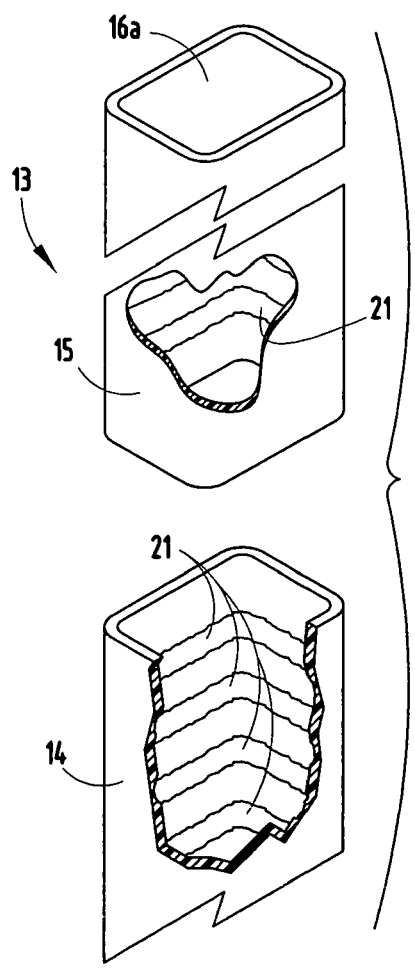
FIG. 14 is a partial exploded perspective view of a broken shaft with locking channels.
Figure 15:
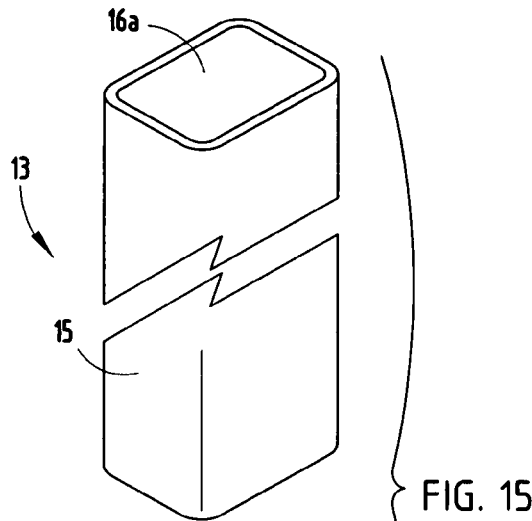
FIG. 15 is a partial exploded perspective view of a broken shaft with a foam plug.
Figure 16A:
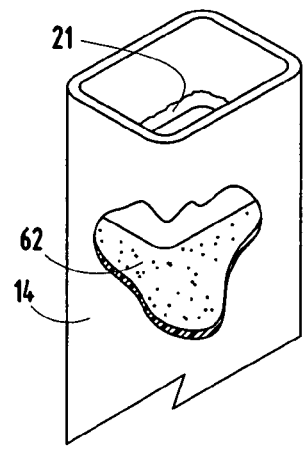
FIG. 16A is a perspective view of a rod.
Figure 16A:
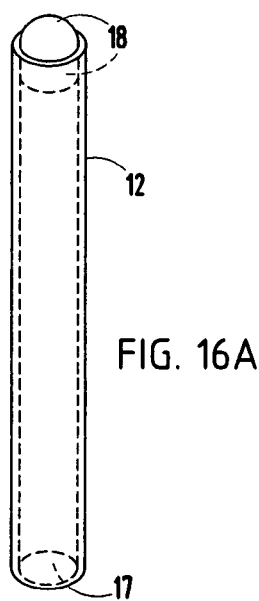
Figure 16:
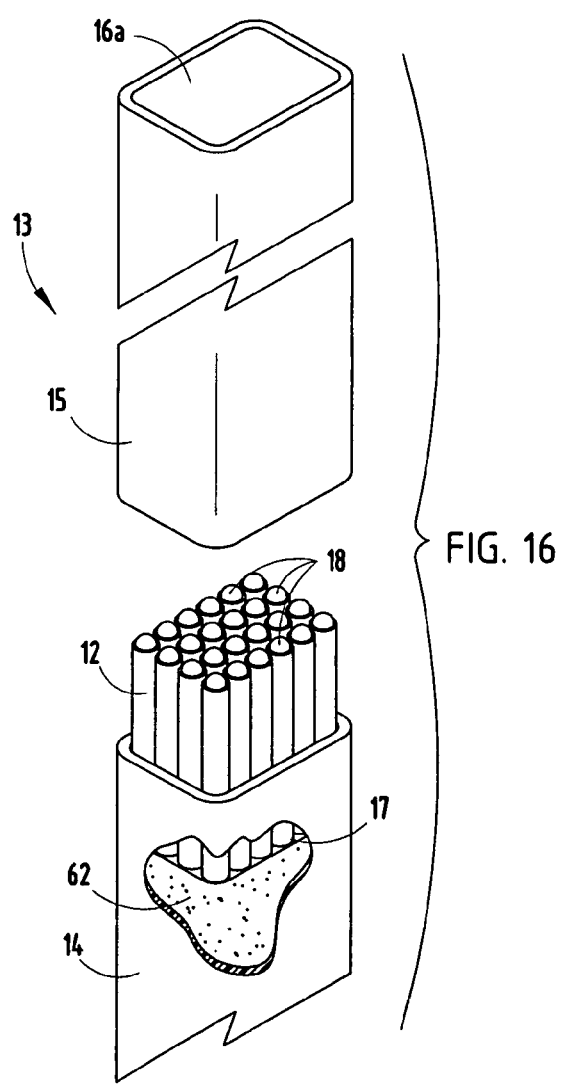
FIG. 16 is a partial exploded perspective view of a broken shaft with rods.

As an alternative, carbon-fiber rods 12 (see FIG. 16A) may be used to provide structural support to a hollow object 13 having first and second hollow portions 14, 15. The second hollow portion has a top end 16*a* that may be uncovered or covered by a cap 16*b*, as shown in FIG. 13. The carbon-fiber rods 12 are preferably hollow and approximately 3 to 6 inches in length. Typically, the rods 12 have an open end 17 and a closed end 18, however, both ends may be closed. The closed end 18 may be solid, but may be covered by glue, tape, a cap, etc. As illustrated in FIG. 13, to apply the rods 12, the damaged portion 20 of the first and second hollow portions 14, 15 is cut off just above the damage 20 to remove any loose carbon-fiber strands, epoxy, laminate, etc. Next, the grooving bit 30 is used to create locking channels 21 (shown in FIG. 14) inside the first hollow portion 14 and the second hollow portion 15. After the locking channels 21 are created, a plug/stopper 62 (see FIG. 15) is inserted into the first hollow portion 14 and forced to a predetermined position via the end 72 of the insertion tool 70 (shown in FIG. 11). The end 72 of the insertion tool 70 has a length adequate to allow the rods 12 to rest approximately half-way inside the first hollow portion 14. As illustrated in FIG. 16, the rods 12 are inserted into the first hollow portion 14, with the open end 17 in contact with the plug/stopper 62. The closed end 18 of the rods 12 protrudes outside of the first hollow portion 14.

Figure 17:
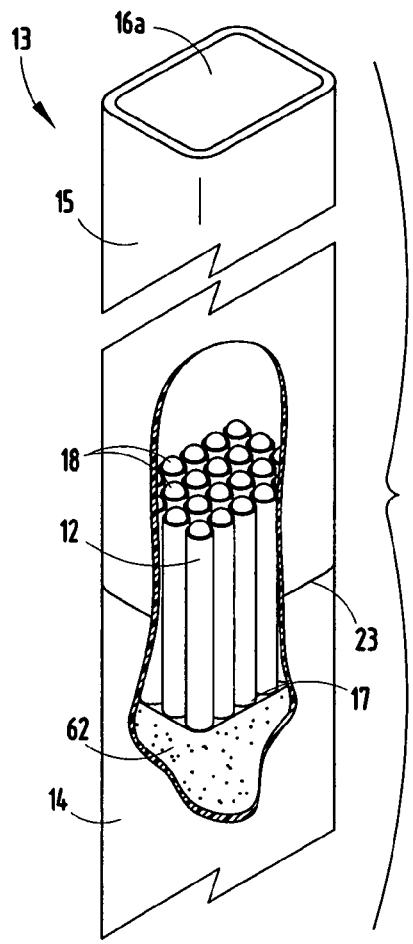
FIG. 17 is a partial exploded perspective view of a reconnected broken shaft with rods.
Figure 18:
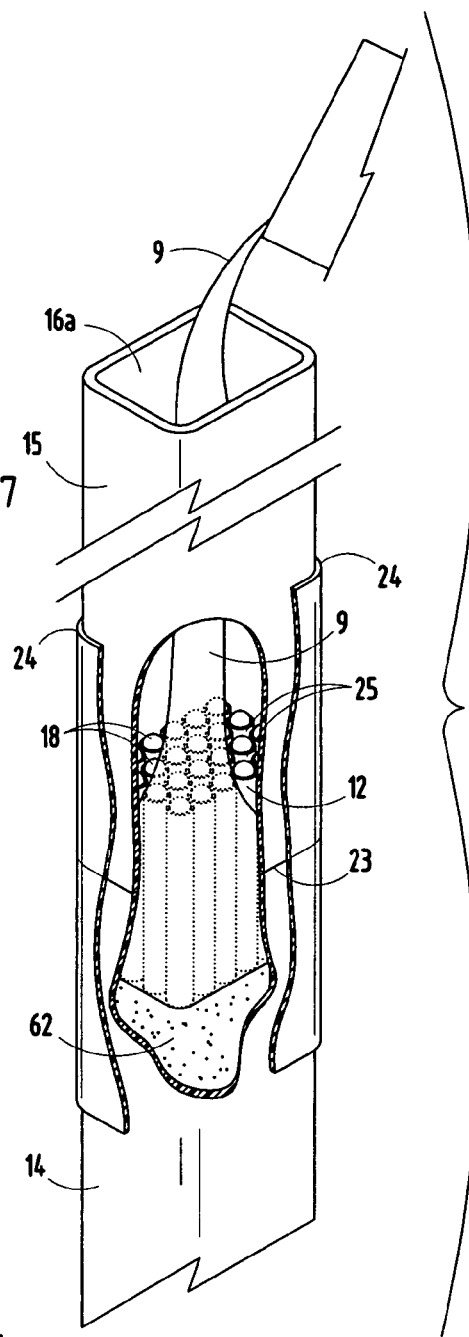
FIG. 18 is a partial exploded perspective view of a reconnected broken shaft with adhesive on the rods.
Figure 18A:
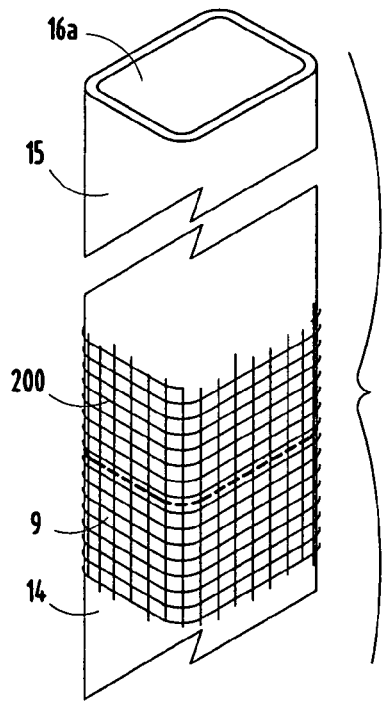
FIG. 18A is a partial exploded perspective view of a shaft with a sleeve around the shaft.

As shown in FIG. 17, after a predetermined number of rods 12 have been inserted into the first hollow portion 14, the second hollow portion 15 is placed on top of the first hollow portion 14 and over the protruding rods 12. Consequently, about half the length of the rods 12 is inside the first hollow portion 14 and half the length of the rods 12 is in the second hollow portion 15 (see FIG. 18). After the second hollow portion 15 has been inserted on top of the first hollow portion 14 and over the protruding rods 12, a seam 23 between the first and second hollow portions 14, 15 is covered with tape 24, thereby sealing the seam 23. Next, the hollow portions 14, 15 are placed in a generally vertical orientation, if they are not already vertically oriented, and an adhesive 9 is poured into an end of the hollow object 13 and into contact with the rods 12. At this time small reinforcing shapes such as carbon fiber beads, mini rods, cylinders, cones, pyramids, microspheres, macrospheres, tiny hollow balls, tiny foam filled balls, etc. may also be poured into the end of the hollow object 13. The closed end of the rods 12 prevents the adhesive 9 from filling the rods 12. It may be appropriate to gently shake the materials inside the hollow object 13 to settle all the materials. The adhesive 9 is allowed to fill the gaps 25 between the rods 12 and cannot flow past the plug/stopper 62.

Figure 22:
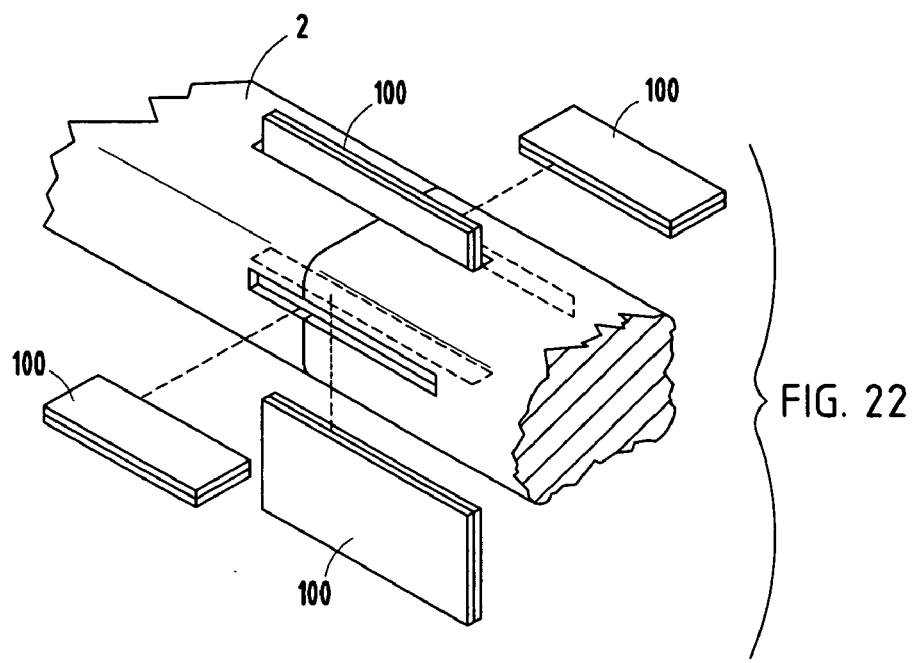
FIG. 22 is an enlarged exploded perspective view of a solid shaft with external wafers on four sides.
Figure 23:
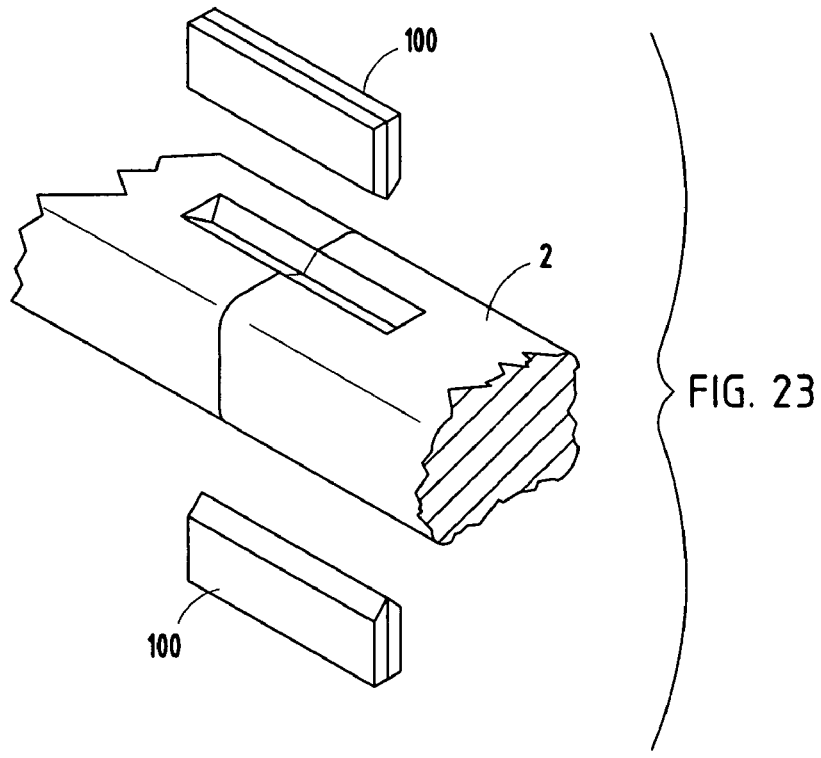
FIG. 23 is an enlarged exploded perspective view of a solid shaft with external wafers on two sides.

The structural damage repair method may be or also include a solid shaft repair system (see FIGS. 22 and 23). Wafers 100, as discussed in further detail below, may include specifically angled edge cuts 101. This allows two or more wafers 100 to fit together when angled edge cuts 101 are placed in contact with one another. It is also conceivable that these angled edge cuts 101 may lock or interlock with one another so as to be connected via means other than just to be in contact with one another. In a shaft repair system, through grooves 102 are created generally perpendicular to the fracture in the shaft 2. It is conceivable that these through grooves 102 may be positioned otherwise in relation to the fractures in the shaft 2, however, through grooves 102 must at least intersect the fracture in the shaft 2. A chemical molding agent, wafers 100 and/or rods 12, and a sealant, discussed further below, may also be utilized in a manner substantially the same as previously discussed. This shaft repair system may be utilized in hollow shafts or solid shafts.

Alternatively, a sleeve 200 may be used to repair the shaft 2, including at the hozel region of a hockey stick 1. In this instance, a carbon fiber sleeve 200, as will be discussed in further detail below, is used to externally around the shaft 2 to provide support at the break. After the damaged ends 20 are removed from both the first and second hollow portions 14, 15, adhesive is added to an outer circumference of both the first and second hollow portions 14, 15 where the first and second hollow portions 14, 15 will be joined. A sleeve 200 is then added over the epoxied area with approximately half of the sleeve 200 covering the first hollow portion 14 and half of the sleeve 200 covering the second hollow portion 15. Additional adhesive is then added to an outer portion of the sleeve 200 and allowed to cure. Once the adhesive has cured, it can be sanded and painted, or additional sleeves 200 can be added. It is also foreseen that fabric may be added to any side or sides to further aid in connecting the first and second hollow portions 14, 15.

The present invention includes a method for repairing structural damage to a flat or slightly curved object such as a hockey stick blade 4. The repair can be accomplished by using an adhesive 9 (chemical molding agent), one or more rods 12 or wafers 100, one or more sleeves 200, and a brush 112. The kit may also optionally include flexible flat supports 114, wrapping tape 103 and/or a sealant. The method of repairing a flat or curved item, such as a hockey stick blade 4, is described in further detail below.

Figure 24:
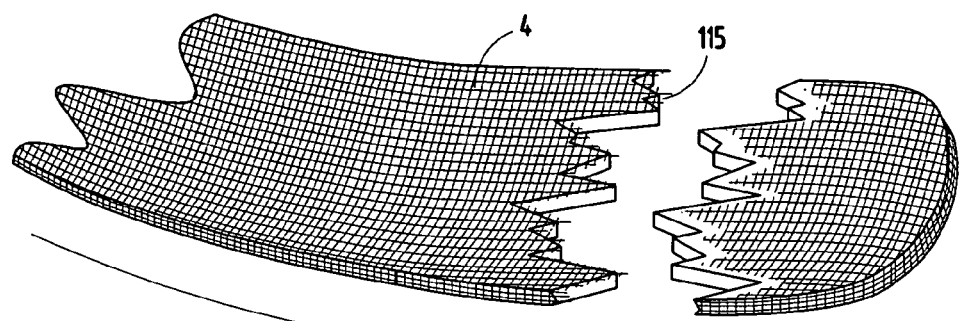
FIG. 24 is a partial perspective view of a broken hockey stick blade.
Figure 25:
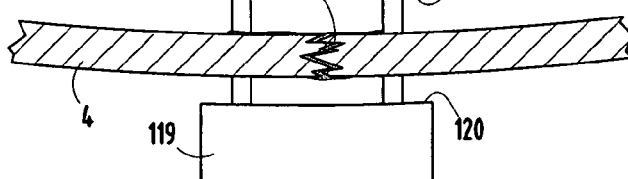
FIG. 25 is a side elevational view of a radius restorer.
Figure 26:
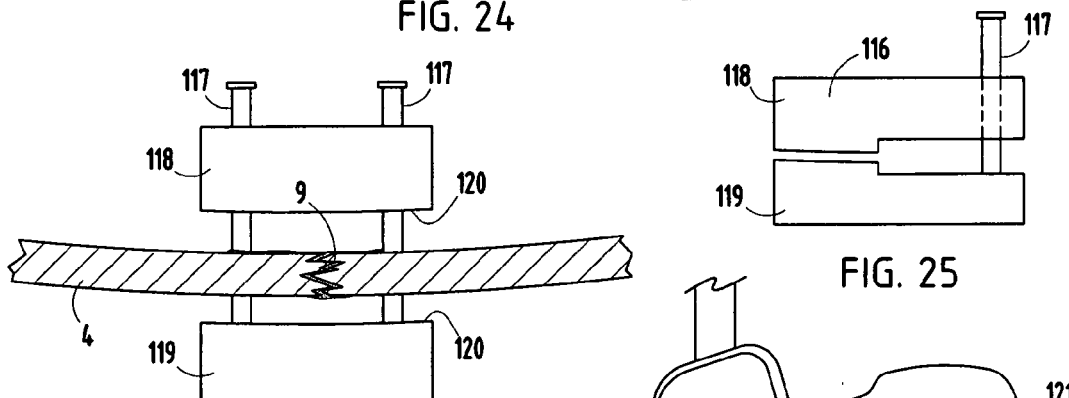
FIG. 26 is a front elevational view of the radius restorer of FIG. 25 with a portion of a hockey stick blade.
Figure 27:
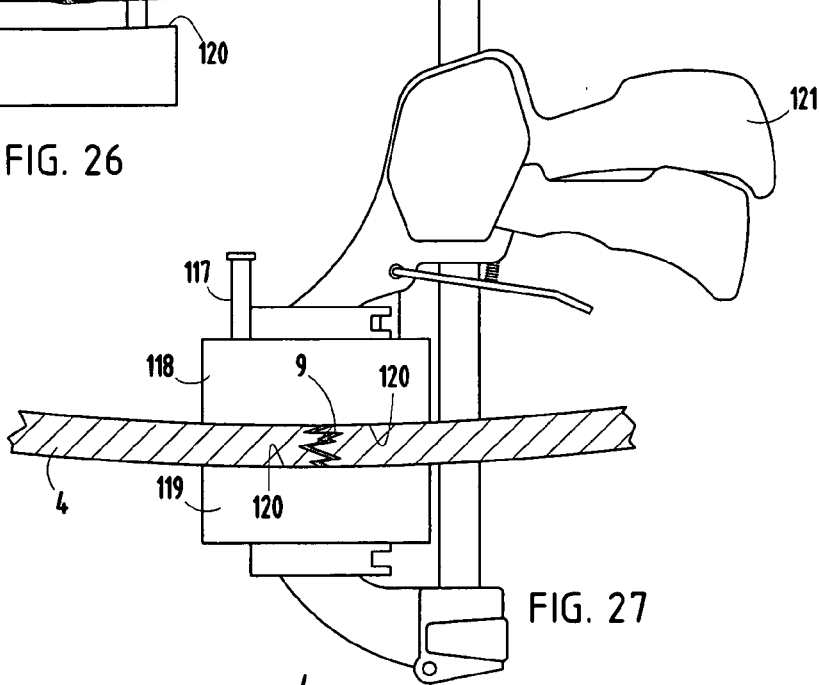
FIG. 27 is a side elevational view of a clamp, radius restorer and hockey stick blade.
Figure 28:
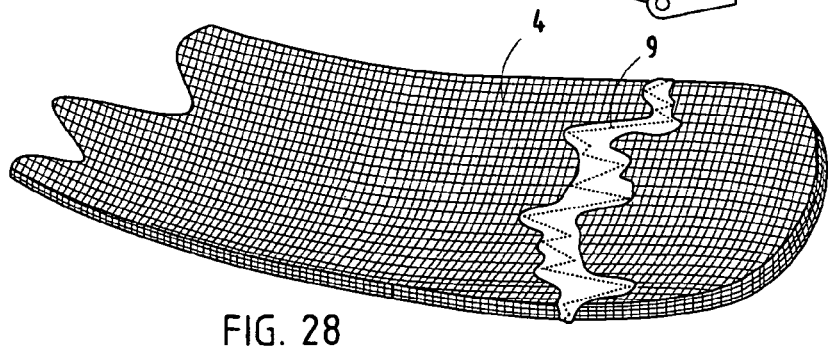
FIG. 28 is a partial perspective view of a partially repaired hockey stick blade.
Figure 42:
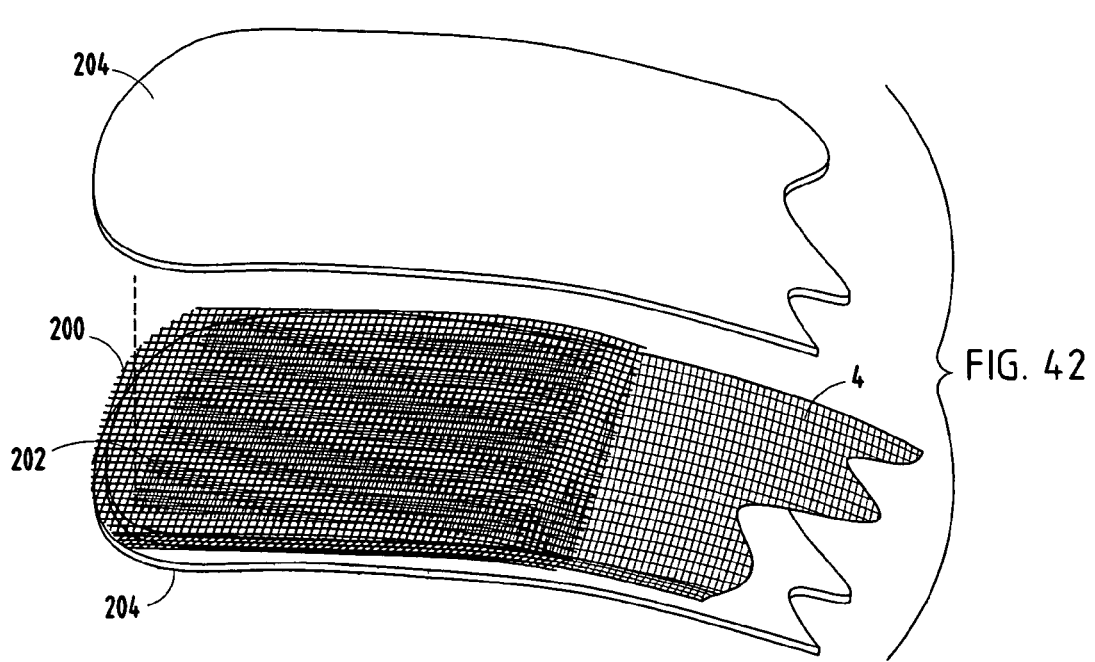
FIG. 42 is a partial perspective view of a partially repaired hockey stick blade between flat supports.

Initially, any loose fibers or splinters 115 (see FIG. 24) should be trimmed to get the parts to return to close proximity and original alignment. A radius restorer 116 (shown in FIG. 25) is used to keep the parts in alignment during the curing time of the adhesive 9. The radius restorer 116 includes two pins 117 that connect first and second clamping members 118, 119. The first clamping member 118 may be moved relative to the second clamping member 119 by sliding along the two pins 117. In addition, as illustrated in FIG. 26, the radius restorer 116 has contact portions 120 that are slightly curved. The slight curve of the contact portions 120 assists in obtaining and maintaining the desired blade radius/curve. To maintain the proper blade curvature, radius restorers 116 used in conjunction with a hand clamp 121, shown in FIG. 27, may be preferable, depending on how damaged the blade 4 is. If the curve is out of alignment after 24 hours, it is possible to readjust and reclamp for another two days. The adhesive is somewhat pliable for the first 48 hours and may be bent slightly. After 48 hours, however, this is no longer possible. On a completely broken off blade, it is imperative that the blade be reassembled with the proper "lay." This may be accomplished by using a flat support form to ensure proper angulation or "lay." The radius restorers 116 may be applied directly over flat supports 204 (see FIG. 42).

The adhesive may be applied to the structurally damaged area of the object to be repaired. Often, the adhesive is applied by troweling, brushing, or pouring the adhesive on the damaged area. Typically, the adhesive 9 has sufficient shape-retaining characteristics to allow a user to reshape the structurally damaged object to its original and/or desired shape. The adhesive will then harden and retain the original and/or desired shape of the object. Any adhesive may be used in this embodiment of the present invention. The adhesive may be any adhesive agent, molding agent, shape-retaining compound, reinforcing agent, restructuring agent and/or restitution agent. Of course, the adhesive may also be any combination and/or derivation of any of the above. The adhesive may include but is not limited to, epoxy, epoxy resin, epoxy for wet applications (i.e., marine epoxy), multi-party epoxies, flex-epoxy, mercaptans, polyesters, urethanes, polyvinylchloride (PVC) cement, polyvinyl acetate, cellulose nitrate, polyvinyl butyral, polymethacrylates, methacrylates, polyvinyl alcohol, methylacrylate/ethyl methacrylate, polyurea, etc. and any combinations or any derivations of any of the above including polymers and/or copolymers of any of the above, however, epoxy resin is typically preferred. After the adhesive 9 is applied to the object to be repaired, it is allowed to cure. Once the sealant has cured/dried, the remaining cured sealant is removed, typically by using a sanding device, however, any device may be used. By sanding off this excess sealant and adhesive 9, the surfaces of the object are smoothed.

Most typically, the adhesive alone is insufficient to repair and/or restore the object to its original strength and/or increase the strength of the object. Accordingly, methods to enhance the strength of the repaired area are necessary. Specifically, reinforcement members and/or fabric and sleeving members are typically necessary to strengthen the object to be repaired.

To apply reinforcement members, such as rods 12 or wafers 100, grooves must first be made in the object to be repaired. Two methods have been developed for preparing the grooves. The first method involves use of a drill with a jig to assist in aligning and angling the grooves, and the second method involves using a grinding wheel attached to a drilling tool.

Figure 29:
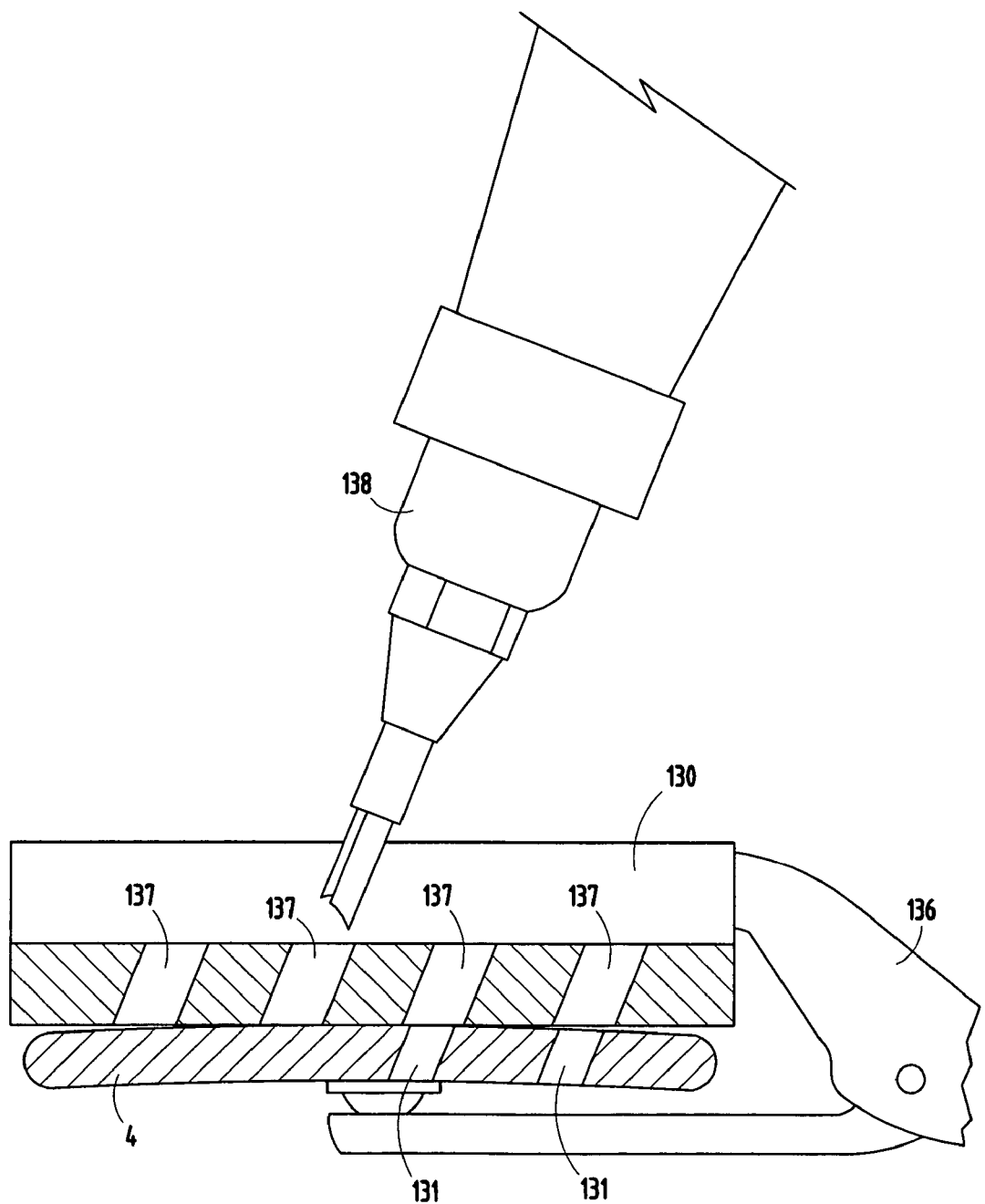
FIG. 29 is a perspective view of a jig with a hockey blade.
Figure 30:
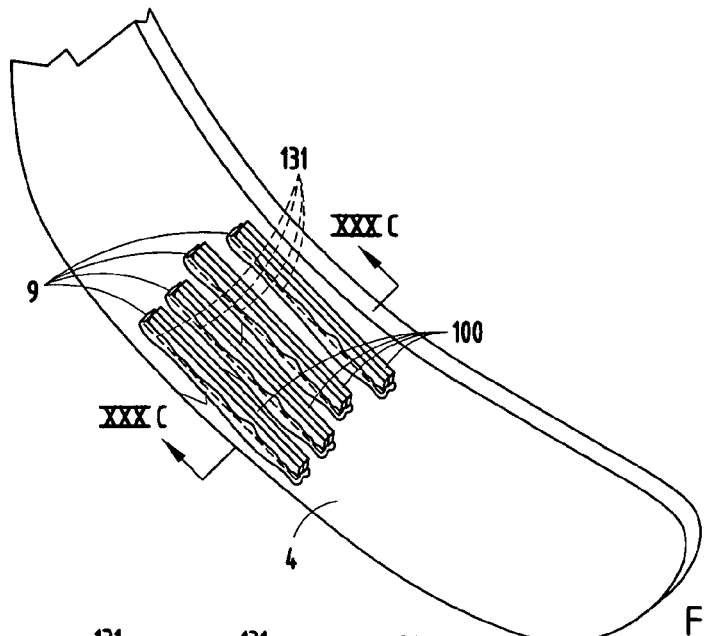
FIG. 30 is a perspective view of a broken hockey stick blade with grooves and wafers.
Figure 30A:
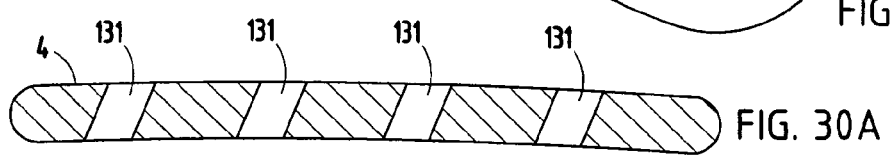
FIG. 30A is a cross-sectional view of a channel arrangement.
Figure 30B:
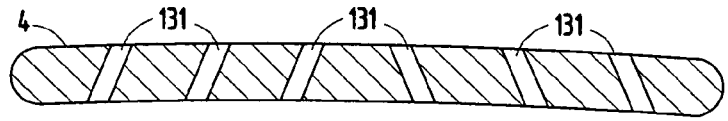
FIG. 30B is a cross-sectional view of another channel arrangement.
Figure 30C:
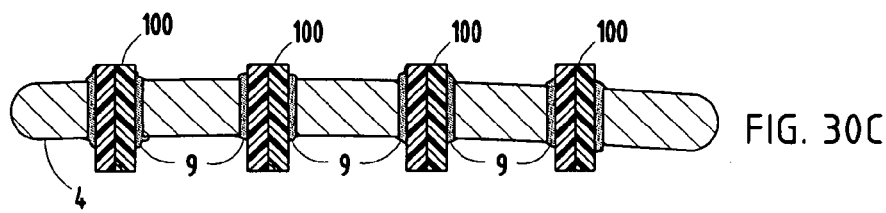
FIG. 30C is an enlarged cross-sectional view of blade with wafers protruding out of grooves.
Figure 30D:
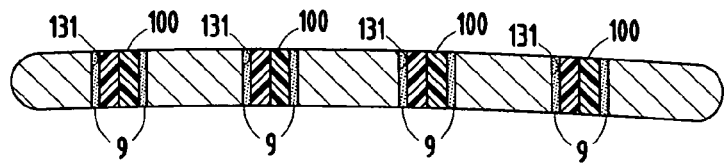
FIG. 30D is an enlarged cross-sectional view of a blade with sanded wafers.

Regarding the first method and referring to FIG. 29, a jig 130 is optionally used as a guide to cut grooves 131 which are preferably staggered, or apertures in the object to be repaired. Jig 130 may be made of any type of material, including, but not limited to, wood, metal, plastic, or any combinations or derivations thereof. Jig 130 is typically a rectangular shape, however, it is conceivable that jig 130 may be any shape depending upon the shape and size of the object to be repaired. The jig 130 has a centerline that is typically placed approximately perpendicular to the fracture of the object to be repaired. In the case of a pocket fracture, jig 130 may not be necessary. Generally grooves 131 are staggered relative to center-line 132. These staggered grooves 131 reduce creating a shear point and/or a shearline in the object to be repaired. That is to say, typically if all grooves 131 were the same length and had the same starting points and end points (i.e., non-staggered grooves), relative to center-line 132, and if the wafers 100 or rods 12 were positioned about parallel axes wherein their respective surfaces also positioned about parallel planes typically it is more likely that a shearing plane and/or shearline would be created at both the starting points and the end points of non-staggered grooves 131 between the non-staggered grooves 131 and the non-fractured and/or non-damaged material of the object to be repaired. Therefore, when applying force(s) to the object that has been repaired, including the non-staggered grooves 131, there is more likely to be a discrepancy between the strength of the newly repaired part of the object and the existing non-repaired part of the object. This discrepancy may create a likely place for future damage and/or fractures. In the present embodiment of this invention, these staggered grooves 131 reduce these shearing planes and/or shearlines by having different groove starting points and end points than the groove 131 immediately adjacent to it such that these shearing planes and/or shearlines are virtually eliminated. As shown in FIGS. 30 and 30A-30D, these grooves 131 may be cut at any desired angle relative to one another which also reduces shearing planes and/or shearlines.

Jig 130 also includes clamp section(s) 136. Clamp section (s) 136 are on either end of the substantially rectangularly-shaped jig 130. Of course, clamp section(s) 136 may be any shape to accommodate the clamp(s) that may be used to clamp jig 130 to the object to be repaired. In the event that it is not possible to clamp jig 130 to the object to be repaired, clamp section(s) 136 of jig 130 may be modified to accommodate any other type of device utilized to secure jig 130 to the object to be repaired. This may include, but is not limited to, suction cups, adhesives, magnetics, etc. However, when possible, a secure clamped connection between jig 130 and the object to be repaired is preferred. Guides 137 in jig 130 may be any length, including a length range of from about ½ inch to 72 inches, more typically from about 2 inches to about 48 inches, and most typically from about 3 inches to about 12 inches. Guides 137 may be any width, including, but not limited to, 1/32 inch to about 2 inches, more typically from about 1/16 inch to about 1 inch, and most typically from about ⅛ inch to ¾ inch. Guides 137 or apertures may be any shape and have any pattern within jig 130. Also, guides 137 in jig 130 may have a knurled cut or surface so that when a user uses a cutting device within jig 130 to create grooves 131, the resulting grooves 131 are knurled or they have the specific surface of the guides 137 in jig 130.

Once jig 130 has been secured to the object to be repaired, grooves 131 are cut in or on the object to be repaired. This cut may be made by any type of tool 138, however, typically a variable speed rotary saw or a DREMEL® tool is preferred. While not necessary, it is preferred that the wafers 100 have a width of less than or equal to the thickness of the fractured area of the object to be repaired. While not necessary, it may be beneficial in repairs involving smaller narrow surfaces or surfaces having many angles to sleeve over the area to be repaired once the wafer 100 has been inserted into the object. This sleeve process may involve covering the area with a portion of reinforcing fabric 11 and a chemical molding agent to aid in reinforcing the damaged area 20 and to further hold the wafer 100 in place during the chemical molding drying process, as will be further discussed below. This method is frequently used to create grooves for wafers 100.

Figure 35:
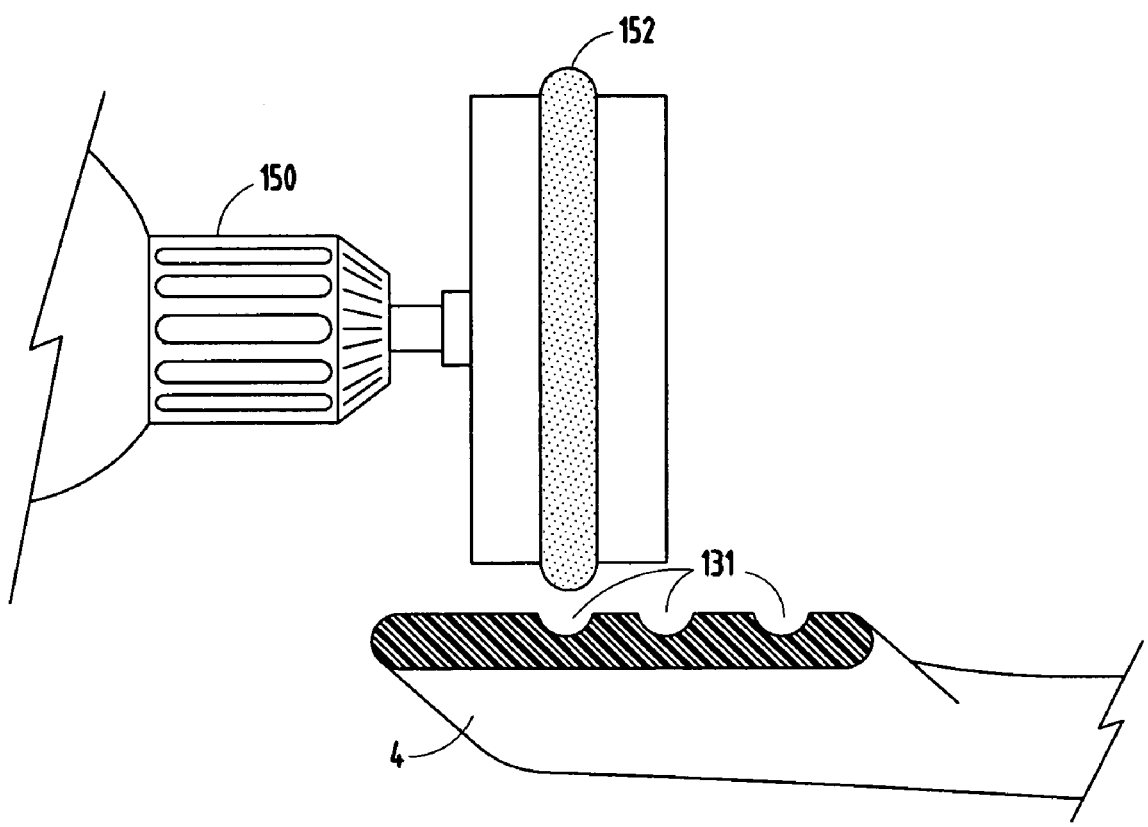
FIG. 35 is a side elevational view of a groove cutting tool.
Figure 36:
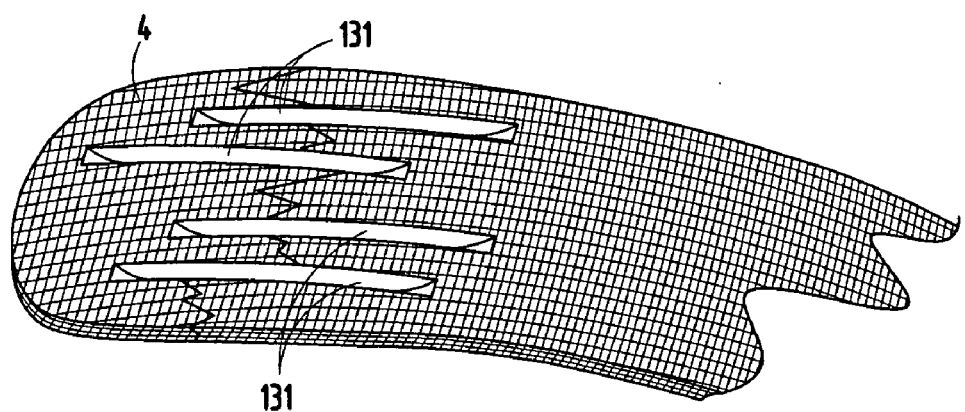
FIG. 36 is a partial perspective view of a hockey stick blade with grooves.

A second method of making the grooves 131 does not involve use of a jig 130, in which case, a user manually staggers the grooves 131 keeping them relatively centered over the damaged area 20. Specifically, the grooves should be staggered so that between one-third and two-thirds of the groove is on one side of the break. This alternating alignment helps eliminate any shearing planes or lines that can be formed at the interface between the repaired and unrepaired areas. Optionally, the damaged areas 20 on the backside of the blade 4 can be marked with a silver or white marker. The top and bottom groove lines should be drawn first, about a ½" (10 mm) from the edge of the blade 4. The next two lines should each be evenly spaced between the top and bottom. It is important that the lines cross the damaged area. Preferably, the damaged area crosses each line at point approximately within the middle one-third of the line. If the break runs diagonally across the blade 4, the grooves 131 will need to be staggered to accommodate the diagonal break. If the damaged area 20 runs down the blade 4 a long distance, it is sometimes desirable to grind a line of grooves 131 one after another down the blade 4 and then stagger each line of grooves 131 under it. This creates a continuous area of reinforcement that still accommodates the curve of the blade 4. As shown in FIG. 35, a drill 150 having a grinding wheel 152 can be used to create the grooves 131 in the surface of the object. The grooves 131 should be cut with a 3/16"×2" grinding wheel 152. Ideally, the grooves 131 are only cut partially into the blade 4, as depicted in FIG. 36. However, if the grooves 131 penetrate the blade 4 creating holes through the blade 4, adhesive can be used to fill the holes. This method of making grooves is generally used when rods are to be used.

In the preferred embodiment, rods are used for grooves that only partially penetrate the object to be repaired. In another embodiment, wafers are used in grooves that fully penetrate the object to be repaired.

Rods

After the grooves 131 have been prepared by either method above, each of the grooves 131 is fitted with an appropriate sized rod 12. The rods 12 are used in a similar manner described in relation to the shaft repair above. However, the rods 12, when used in objects having a thin, curved, construction, frequently have an angle cut at each end of the rod 12. However, the ends of the rods may also be dual angle cut, rounded, square cut, cone-shaped, or cut on a curve. In addition, the rods are frequently solid, rather than hollow. Further, the rods are generally comprised of carbon fiber, but may be constructed from any suitable material, including, but not limited to fiberglass, KEVLAR®, carbon fiber, wood, plastic, metal, etc.; however, typically carbon fiber is preferred. In addition, the rods 12 generally have a diameter that is slightly less then the width of the grooves 131. However, the rods 12 may also have a diameter that is substantially smaller so that more than one rod 12 can be inserted into a single groove 131.

If there are several areas of damage, it may be best to overlap the rod 12 sections to provide continuous reinforcement over longer grooves 131. One difficulty is that the blade 4 has a curvature and the rods 12 do not. However, it is possible to follow the curve of the blade 4 by using two or more pieces of rod 12 and interlocking them. To perform an extended repair, several long continuous grooves 131 are cut for the entire length of repair on the backside of the blade 4. The rod 12 ends should fit together and overlap each other, thereby creating a continuous reinforcement. The rods 12 in other grooves 131 should not have overlaps in alignment with adjacent grooves 131, if possible. The rods in the grooves should stagger over the break and between one-third and two-thirds of the length of the rods should be on one side of the break. Also, typically the repair grooves 131 for the rods 12 are not created in the front side. Because of the curve of the blade 4, this would cause the middle of the rods 12 to lay shallowest over the break.

Figure 37:
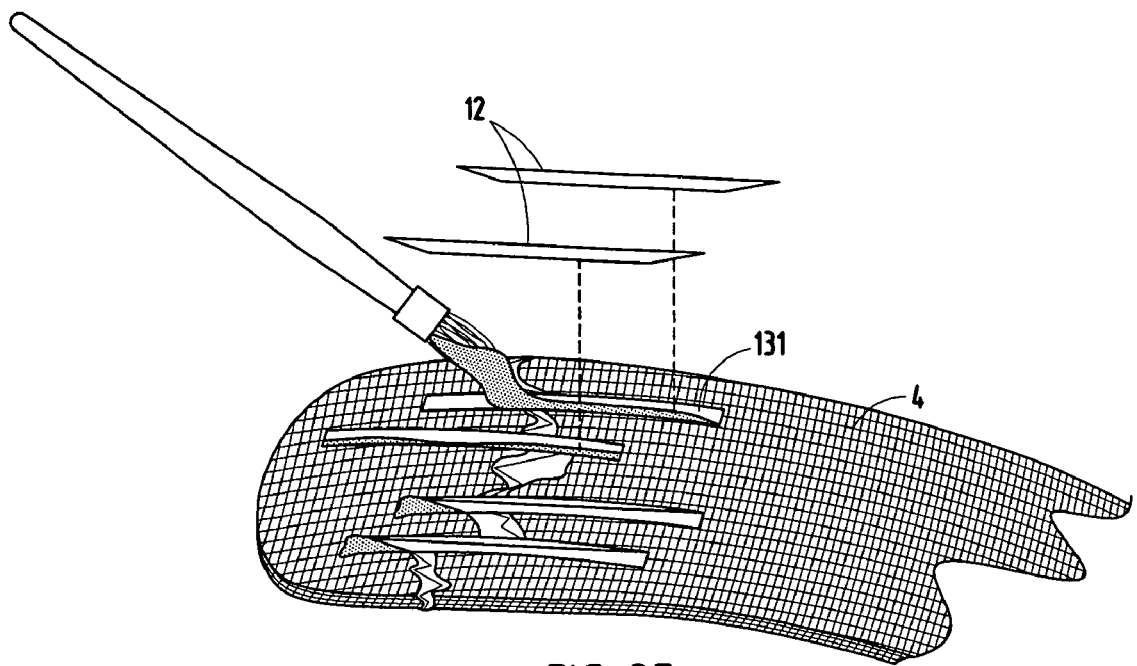
FIG. 37 is a partial perspective view of a hockey stick blade with grooves and rods.

Once the grooves 131 have been cut in the object to be repaired, the grooves 131 are filled with an adhesive 9 (FIG. 37) to aid in completely sealing the grooves 131 when the rods 12 are placed in the grooves 131. The adhesive used herein may be any type of an adhesive, however, an epoxy resin is preferred. After the adhesive has been properly mixed, the adhesive mixture should be spread into the grooves 131. The grooves 131 need not be filled completely. The grooves 131 should be filled approximately half way, but the bottom of the grooves 131 should be completely covered with no bubbles or gaps.

The appropriate rod 12 should be placed into each adhesive filled groove 131. The rods 12 should be oriented so that the cut angle is at the bottom of the groove 131. After the rods 12 have been inserted in the proper position, the entire repair area should be smeared with adhesive. All gaps around the rods 12 and in the grooves 131 should be filled. The rods 12 should not be allowed to move much during this process. If the rods 12 move too much, bubbles will be formed in the adhesive, thereby reducing the repair strength. When finished, the blade 4 should be stored undisturbed in a warm dry place. The blade 4 should be stored at an angle so that gravity pulls the rods 12 and adhesive deeper into the grooves 131. With a thicker adhesive, storing the blade 4 at an angle may not be necessary.

Optionally, rods 12 may be coated with an adhesive, of one of the types previously mentioned. The rods 12 are then inserted into the staggered grooves 131.

Wafers

Alternatively, reinforcement wafers 100, as previously shown in FIGS. 22 and 23, comprised of compressed materials may be used in conjunction with, or instead of, the rods 12. More specifically, the wafers 100 are typically comprised of layers of reinforcing fabric having an adhesive substance in between the layers which are then compressed together. Any type of adhesive may be used, including, but not limited to epoxy, epoxy resin, epoxy for wet applications (i.e., marine epoxy), multi-party epoxies, flex-epoxy, mercaptans, polyesters, urethanes, polyvinylchloride (PVC) cement, polyvinyl acetate, cellulose nitrate, polyvinyl butyral, polymethacrylates, methacrylates, polyvinyl alcohol, methylacrylate/ethyl methacrylate, polyurea, etc., and any combinations or any derivations of any of the above including polymers and/or copolymers of any of the above. It is conceivable that adhesive tapes may also be used. The material layers may be the following types of materials, including, but not limited to fiberglass, KEVLAR®, carbon fiber, wood, plastic, metal, etc. However, typically carbon fiber is preferred. Also, the wafers 100 may be made from any combinations or derivations of the above-mentioned material layers compressed together. The wafers 100 may be made of any number of layers of these materials within the range of from about 1-20 layers, more typically from about 4-12 layers, and most preferably from about 4-8 layers of the above-mentioned materials.

Figure 31A:
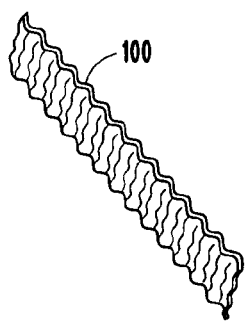
FIG. 31A is a perspective view of a wafer.
Figure 31B:
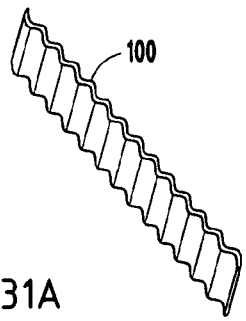
FIG. 31B is a perspective view of another wafer.
Figure 31C:
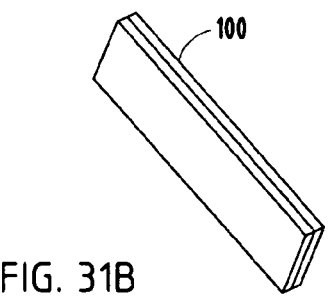
FIG. 31C is a perspective view of another wafer.

The wafers 100 may optionally be knurled as shown in FIGS. 31A-31B. A knurled surface typically will hold or retain more sealant thereby creating a stronger bond between the wafers 100, the sealant and the object to be repaired. Additionally, a knurled surface typically offers more resistance to movement once placed in the object to be repaired. Any type of knurled surface is acceptable, including, but not limited to, checker grooved surface (see FIG. 31A), lateral grooved surface, longitudinal grooved surface (see FIG. 31B), diamond grooved surface, or any other type of knurled surface or any combinations or derivations of the above type of knurled surfaces. It is conceivable that the knurled surface may include a combination of any of these types of above-noted surfaces. The edges of the wafers 100 may be any configuration to better fit into the grooves 131, including, but not limited to rounded edges, square edges, etc., however, typically rounded edges are preferred. It is also conceivable that the grooves 131 in which the inserts are placed may have a knurled cut to create a better fit between the wafer 100 and the groove 131. These wafers 100 may be sized to any shape. However, they will typically be sized to the shape of the corresponding groove 131 in which the wafers 100 are to be placed.

The wafers 100 may be any width, any thickness and/or length. Unlike the rods 12, the wafers 100 should protrude through both ends of the blade. Of course, the width, thickness and length ranges will vary depending upon the shape of the grooves 131 cut into the object to be repaired. The grooves 131 cut into the object to be repaired may vary depending upon the size of the fracture within the object to be repaired. Additionally, these wafers 100 may have tongue and grooved ends or edges, or some other type of interlocking, overlapping or other type of connection so that multiple wafers 100 may be used to fill larger grooved areas or to custom fit a series of wafers 100 into a grooved area. Any type of interlocking, overlapping or adjacent connection may be used.

Figure 32:
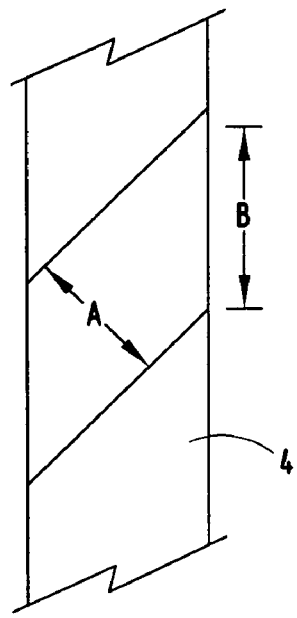
FIG. 32 is a cross-sectional view of hockey stick blade.
Figure 33:
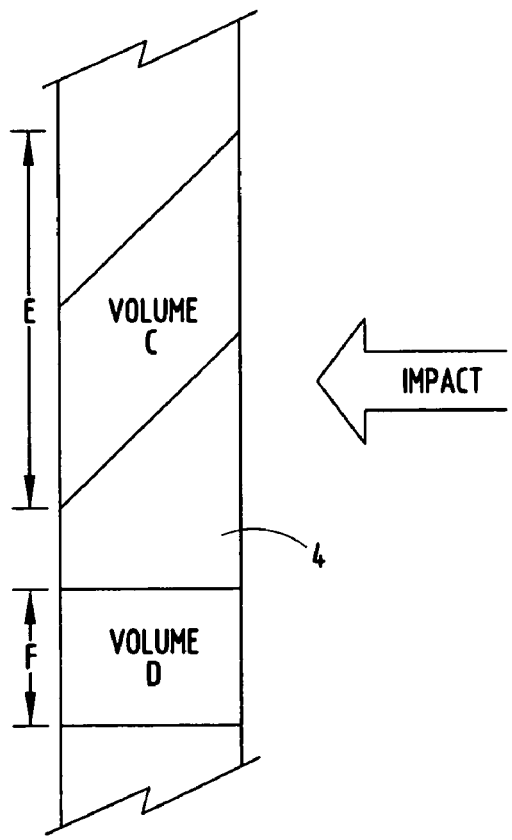
FIG. 33 is a cross-sectional view of hockey stick blade.
Figure 34:
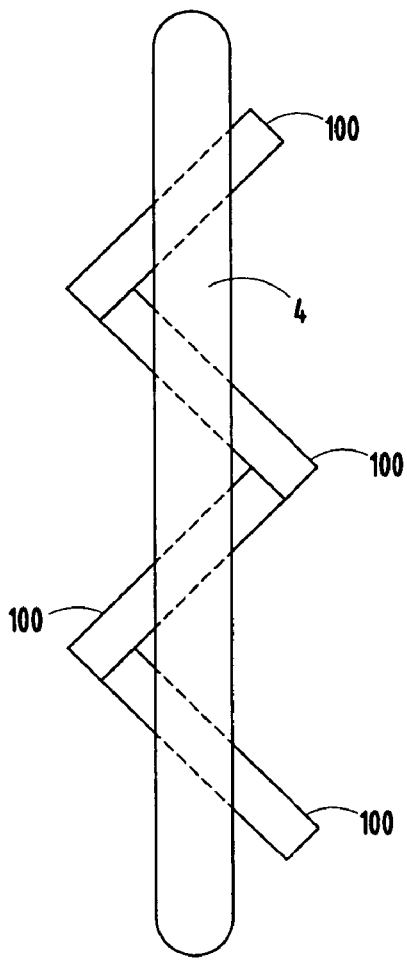
FIG. 34 is a cross-sectional view of wafer arrangement in a hockey stick blade.

Regarding typical surface and/or through fractures, once the epoxy has cured, jig 130 is placed adjacent to the object to be repaired. More specifically, jig 130 is positioned to create the desired grooves 131 or apertures, whether angled or not. Additionally, a jig having a wafer angulation configuration may be used with the wafers 100 (see FIGS. 32 and 33). Referring to FIG. 32, the wafers 100 are configured at angles to create more reinforcement than if the wafers 100 were positioned along parallel axes and parallel surfaces to one another. Typically, as shown in FIG. 32, "A" represents the inside, or typically the puck-receiving portion of the hockey stick blade 4. Referring to FIG. 32, a greater surface area reinforcement is achieved by using the wafer angulation configuration. As seen in FIG. 33, generally the surface area reinforcement and strength withstanding capabilities can be described as follows: (B>A), (C>D) and (E>F). The typical shearlines in this wafer angulation configuration are not similar to conventional shearlines. By employing this wafer angulation configuration, the wafers 100 reinforce where conventional shearlines would be and reduce the likelihood of creating shearlines due to impact distribution. However, staggered wafer 100 configuration may also be employed. Of course, these wafers 100 used in the wafer angulation configuration may be independent of one another when used in a repair, may be connected to one another as described above and may be made of the materials as described above. FIG. 34 shows one example of the wafer angulation configuration. These wafers 100 are placed at approximately a 45° angle relative to the flat face of the hockey stick blade 4. While any angle may be used, typically a 30° or a 45° angle are preferred and provide an increased resistance to fracturing.

If a custom length wafer 100 is required, it should be fashioned by cutting or sanding. It is important that the wafers 100 are organized relative to the position of each wafer 100 in the blade 4. Specifically, after the proper sized wafers 100 have been removed from the grooves 131, they should be placed in order (on a bench, for example) relative to their location in the blade 4. This is of particular importance if multiple wafers 100 are being used in an extended groove 131, as explained below.

Figure 38:
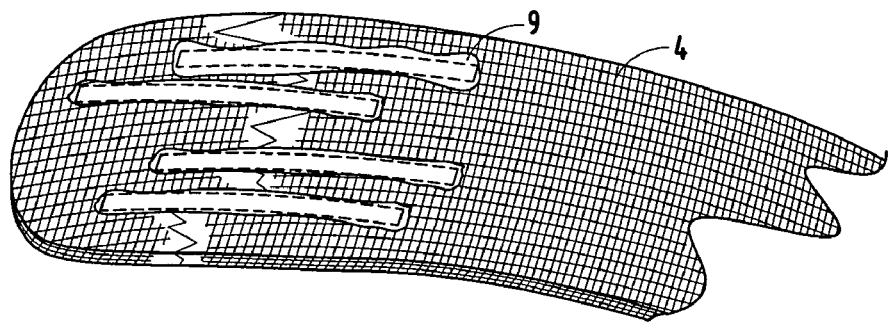
FIG. 38 is a partial perspective view of a hockey stick blade with grooves filled with rods and adhesive.
Figure 39:
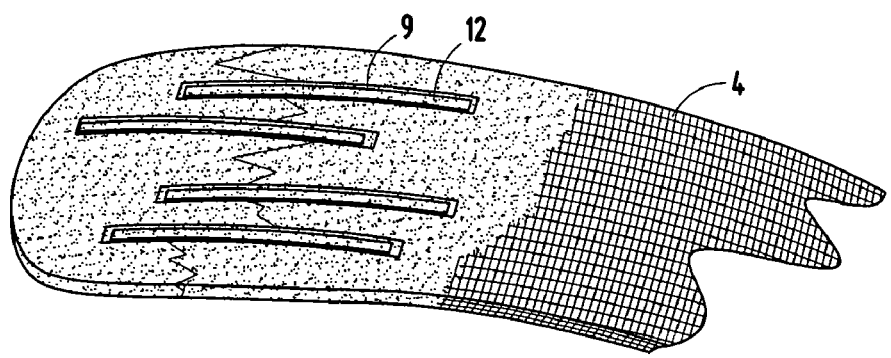
FIG. 39 is a partial perspective view of a partially repaired and sanded hockey stick blade.

Once the rods 12 and/or wafers 100 are inserted into the grooves 131, an adhesive or sealant, of the type previously discussed, is applied to the surface of the object (see FIG. 38). While this adhesive 9 is still wet, a small brush may be used to brush and smooth the surface of the sealant on the object. This smoothes the adhesive coated surface, distributes the sealant over the area to be repaired, and eliminates any voids (i.e., air pockets) in the adhesive-coated surface. The adhesive is allowed to cure for approximately 24 hours. After curing, the excess adhesive and wafer 100 material is removed from the surface of the object. This may be done by any means, including, but not limited to, a mechanical removal process (i.e., sanding, scrapping, chiseling, etc.) or any type of a chemical process (i.e., using a solvent or other type of chemical removal liquid and/or process).

Sanding

After the adhesive is cured, holding the rods 12 or wafers 100 in the blade 4 is preferably sanded to smooth rough edges and to conform the repaired area to the general shape of the blade 4. The sanding method best suited for sanding repair entails use of any angle drill 150 (die grinder) and small 2" (50 mm) sanding disks. Grit can run from 36 to 100, depending on preference and precision. The bigger grit requires a delicate touch, but does scarify (i.e., rough up) the surface well. A shop vac or some type of dust collection system should be operated near the sanding disk to keep flying dust to a minimum.

The original stick 1 surface serves as a guide as to how much material should be removed. The areas over the rod 12/wafer 100 inserts should be sanded until the outlines of the grooves 131 that were cut in the blade 4 can be clearly seen. The blade 4 should be sanded at least 1" (40 mm) past the area to be sleeved. The area to be sleeved and that should be sanded should extend 1 inch past the rods 12/wafers 100 that extend furthest from the break. The sleeved area should extend two inches (50 mm) past the rods 12/wafers 100 toward the tip. This helps the blade 4 to flex more naturally and prevents wear on the repaired area. If the blade 4 is sleeved just slightly past the ends of the repair, the ends of the rods 12/wafers 100 create a shearing plane for future breakage. In addition, the sleeved area should extend slightly up the hozel 3 if possible. This is a prime breakage area and with this preventative maintenance completed, the end-user will have a more durable repair.

The edges of the blade 4 should be sanded very carefully. Because these surfaces are narrow, they can be notched or gouged quickly. Smooth long passes should be made on these areas. Hidden damage to the blade 4 that was previously overlooked may be visible at this time. These areas can usually be reinforced and repaired in the sleeving process. One of the most typical types of damage that shows up is a split along the bottom edge of the blade 4. When the blade 4 is sleeved, adhesive should be rubbed into this crack and then reinforced with carbon fiber tape. The bottom edge should usually be reinforced with tape as part of the final sleeving process. If further reconstruction is necessary, it is appropriate to do so before any sleeving takes place.

Sanding should remove all of the finish and external paint/coating from the stick blade repair area. Most shafts 2 and sticks 1 will show a dull dark gray carbon fabric or weave under the paint. Any repairs made should be smoothed into the adjoining shaft. Bumps or hard edges should not be left on the blade 4. In addition, all shaft and repair edges should be rounded slightly. This aids in longevity of the repair. Hard edges or bumps create fracture lines for future damage. When the sanding is complete, the fabrics 11 and sleeves 200 may be installed.

Fabrics and Sleeves

Figure 40:
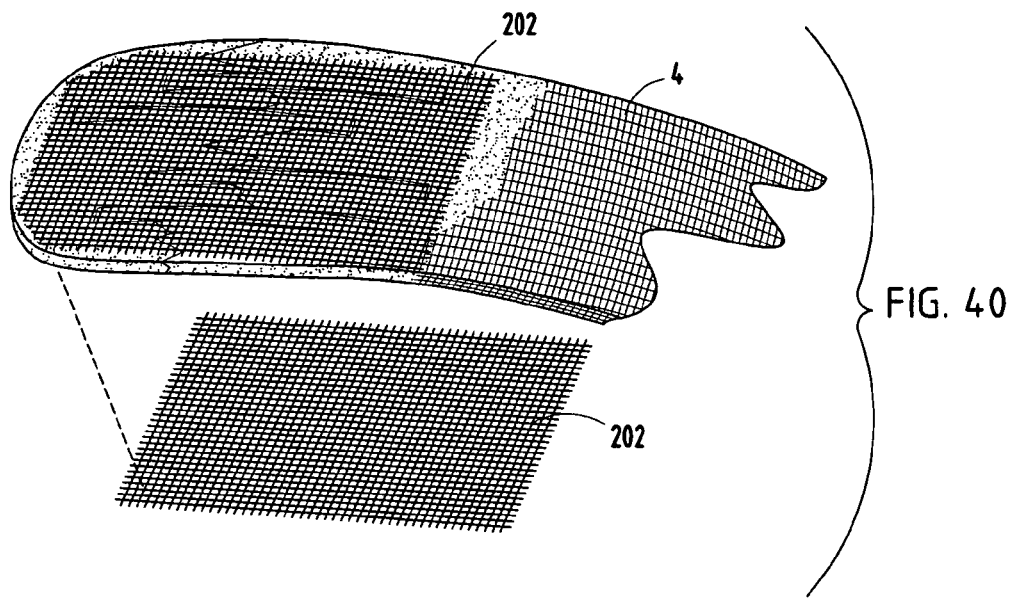
FIG. 40 is a partial perspective view of a hockey stick blade with fabric.
Figure 41:
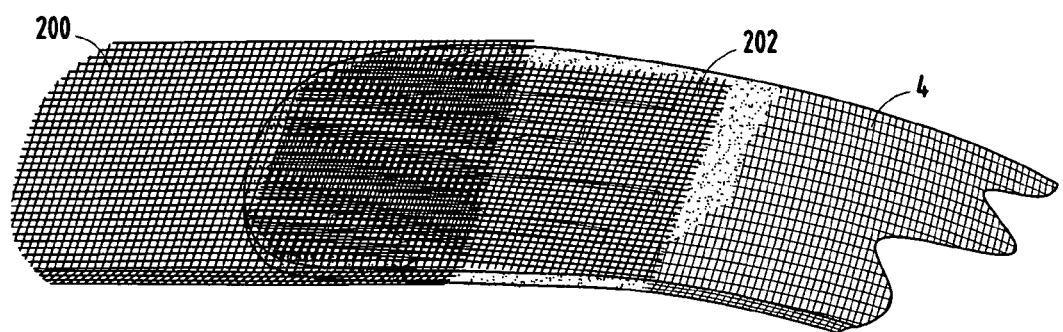
FIG. 41 is a partial perspective view of a hockey stick blade with fabric and a sleeve.

Typically, a sleeve 200 and/or separate piece of fabric are added over the repaired area to enhance strength and durability. Preferably both a sleeve and a fabric are used. The structural strength enhancing sleeves 200 and fabrics 202 are generally comprised of woven materials. More specifically, the sleeves 200 and fabrics 202 (see FIGS. 40 and 41) are typically comprised of one or more layers of woven fabric. The sleeves 200 may be the same or similar length, but may be different lengths depending on the repair and geometry of the object being repaired. An adhesive substance can be used to adhere the sleeve 200 to the damaged object and to hold the object together. Any type of adhesive may be used, including, but not limited to epoxy, epoxy resin, epoxy for wet applications (i.e., marine epoxy), multi-party epoxies, flex-epoxy, mercaptans, polyesters, urethanes, polyvinylchloride (PVC) cement, polyvinyl acetate, cellulose nitrate, polyvinyl butyral, polymethacrylates, methacrylates, polyvinyl alcohol, methylacrylate/ethyl methacrylate, polyurea, etc., and any combinations or any derivations of any of the above including polymers and/or copolymers of any of the above. A bis-A based epoxy is preferred. The woven material 202 layers may be the following types of materials, including, but not limited to fiberglass, KEVLAR®, carbon fiber, wood, plastic, metal, etc., however, typically carbon fiber is preferred. The sleeves 200 may be made of any number of layers of these materials 202 within the range of from about 1-4 layers, more typically from about 1-3 layers, and most preferably 2 layers. The sleeves 200 may be any width and thickness. The width and thickness will vary depending upon the size and shape of the object to be repaired.

The sleeves 200 and the fabric 202 should be cut to length. For shaft side breaks, the length should be enough to cover up the hozel 3 slightly and at least half of the blade 4. For breaks on the tip half of the blade 4, the sleeve 200 should extend 1" (40 mm) past both ends of the reinforcing rods 12.

The shaft 2 should be clamped firmly in a vise to ease painting of the adhesive over the entire sanded repair area, including the bottom of the shaft 2. The fabric 202 should be applied to the bottom of the repair area. The fabric 202 should cover the bottom edge and wrap just slightly to the front side. The majority of the fabric 202 should be on the backside of the blade 4. The purpose of the fabric 202 is to double up the reinforcement near the puck impact zone.

After the fabric 202 has been applied to the backside of the blade 4, adhesive can be painted over the fabric 202. The adhesive should be rubbed into the fabric 202 from the middle out toward the ends until it appears smooth. When the fabric 202 is flat and completely saturated with adhesive, additional adhesive should be applied. The additional adhesive enhances the wetting out of the sleeve 200 that goes over the fabric 202. Once the additional adhesive has been applied, the sleeve 200 may be slid over the blade 4 and fabric 202. The sleeve 200 should then be stretched outward from the middle to shrink the sleeve's diameter and tighten the sleeve 200 onto the blade 4. The sleeve 200 should be painted with adhesive outwardly from the middle toward the ends in a similar fashion to the fabric 202. The sleeve 200 should be fully saturated and smooth. Once the sleeve 200 is fully saturated and smooth, additional adhesive should be applied to be sure that enough adhesive has been added to the entire sleeved area. Multiple sleeves 200 and fabric 202 may be applied to the damaged area to increase the durability of the damaged area after the repair is complete.

Curing

Figure 43:
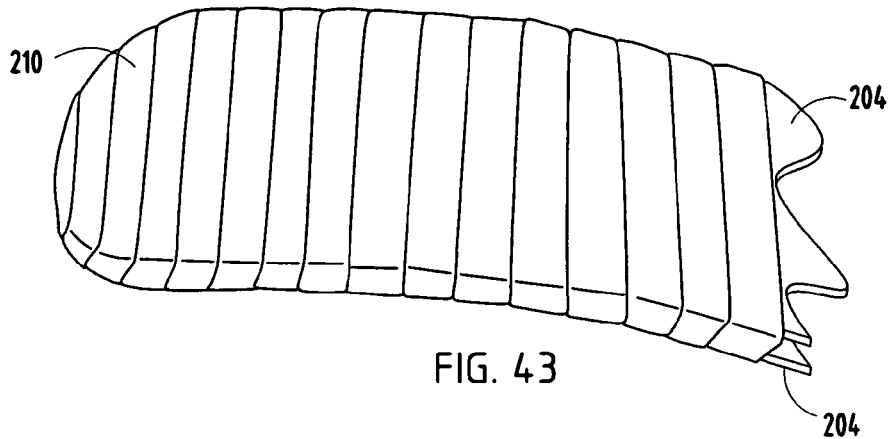
FIG. 43 is a partial perspective view of a partially repaired hockey stick blade covered with tape.

After the adhesive has been fully applied, one or more flat supports 204 (see FIG. 42), that are generally shaped similar to the shape of the object are then placed on at least one side, and preferably two sides, of the damaged object. An appropriate flat support 204 will have a height that is less than the height of the blade 4. This ensures that the blade 4 edges are not covered by the flat support 204 and instead are in contact with a molding tape 205 that will be wrapped around the blade 4 and flat supports 204. This facilitates additional compression to the edge of the blade 4. The supports 204 are preferably made of a resilient but slightly flexible material, such as polypropylene. After one or more flat supports 204 have been added to each side of the blade 4, the blade 4 and flat supports 204 are then completely wrapped in the silicone tape 210, preferably 1-½" wide "square" EXTREME® brand tape (see FIG. 43). The flat supports 204 are clamped to the blade 4 using any clamping means desired, such as by a standard commercially available clamp 121, and the adhesive 9 is allowed to cure.

Optionally, holes 216 may be punched in the tape 210 after it has been thoroughly wrapped over the blade 4 and flat supports 204. This allows excess adhesive 9 to ooze from the blade 4 area. In addition, this area may be wrapped with two layers of tape 210 to prevent splitting.

Figure 44:
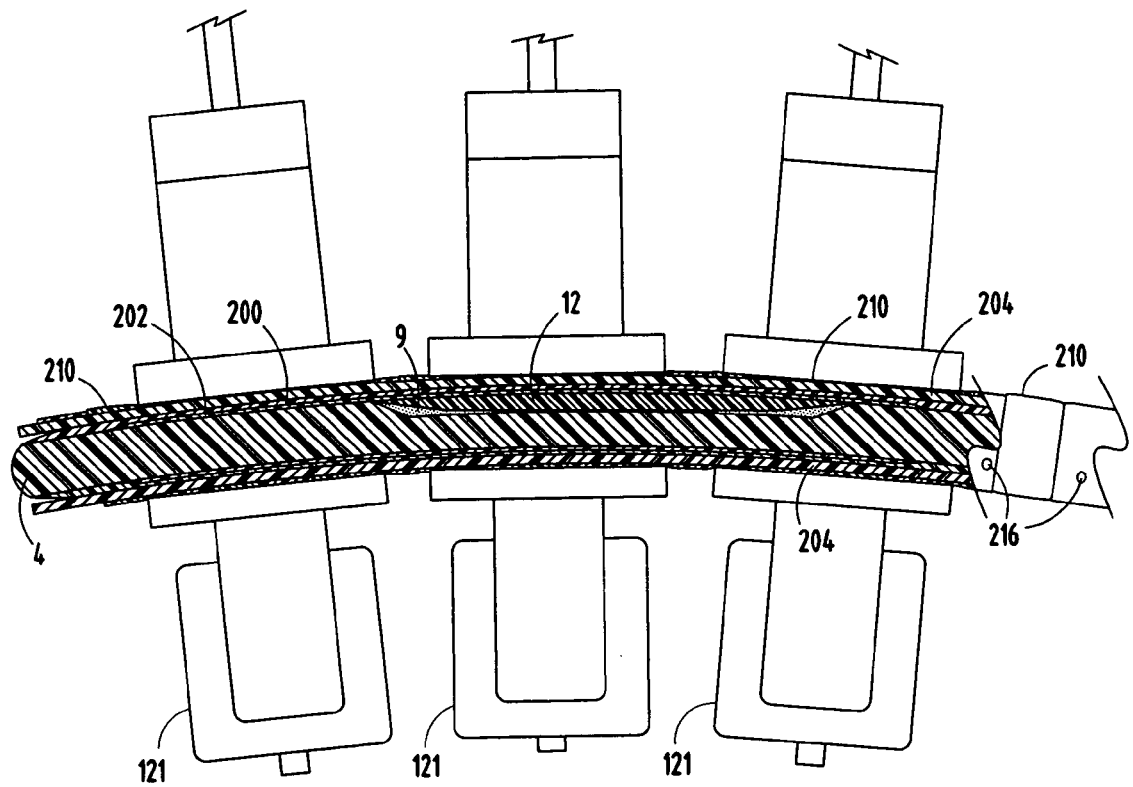
FIG. 44 is a partial cross-sectional view of the blade of FIG. 43 secured between clamps.

As shown in FIG. 44, after the tape 210 has been applied, clamps 121 are added to compress the repair securely within the blade 4. Ideally, the clamps 121 will squeeze the repair to a thin, light, and smooth construction. Any number of clamps 121 may be necessary. Once the clamps 121 are in position and securely tightened, the tape 210 may be punctured to release excess adhesive. Any punctures in the tape 210 should not exceed ½ inch in distance along the top and bottom edges of the blade 4. Too many holes 216 may result in tearing of the tape 210.

Preferably, the repair should be allowed to cure for two days at approximately 70° F. at constant temperature. Once the adhesive is cured, the tape 210 is cut and removed, and the flat supports 204 are removed by peeling them away from the object. After the tape 210 and flat supports are removed, raised edges of cured adhesive 9 on the repair will be visible. This material should be removed by an angle drill 150 equipped with small sanding disks. Any adhesive that has been squeezed out onto the non-repair area should also be ground away. If any paint is removed, it can be repainted at a later time.

The adhesive may be removed by any means, including, but not limited to, a mechanical removal process (i.e., sanding, scrapping, chiseling, etc.) or any type of a chemical process (i.e., using a solvent or other type of chemical removal liquid and/or process). Cuts should not be made on the flat supports 204, as any imperfections, nicks or cuts may show on future repair jobs.

Figure 45:
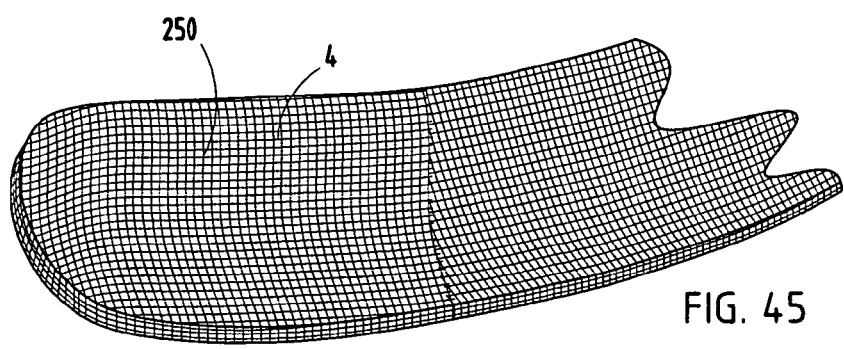
FIG. 45 is a partial perspective view of a repaired hockey stick blade.

Once the excess adhesive has been ground away and any raised edges have been flattened, it is important to finish sand the edges and transition areas (areas going from original to repair). Finish sanding the edges ensures that there are no carbon fiber burrs or raised adhesive areas. Generally, 80 grip spinning sand paper and Scotch-Brite pad combi wheels made by 3 M may be used. After smoothing all edges in the surface of the object to be repaired, the newly repaired area is ready to be sealed, painted, or to have some other type of chemical application applied to the surface thereof (see FIG. 45). The repaired area is preferably sprayed with a sealant, more preferably a sealant lacquer.

The lacquer is applied to the surface of the sleeve 200 and to the surface of the object. The lacquer is then allowed time to cure or dry. The lacquer may include any type of sealant, including, but not limited to, a lacquer, an adhesive, a water-sealant, a UV-resistant sealant, a moisture-resistant sealant, etc. A lacquer sealant is typically preferred.

The sealant is allowed to cure for approximately 24 hours. The resulting repaired object is returned to its original strength, if not stronger. The repaired area 250 is generally the same size and shape as the original object (see FIG. 45).

Rebuilding with Adhesive

Figure 46:
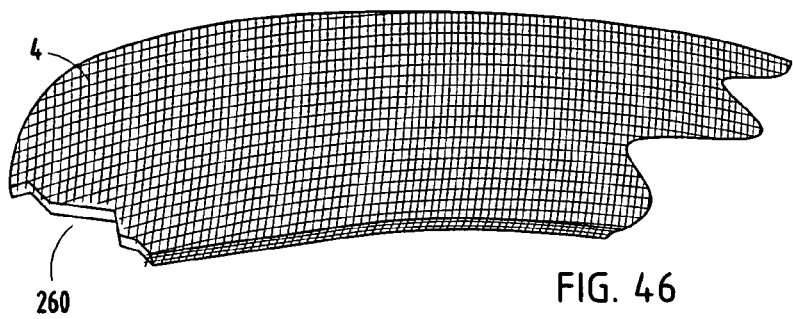
FIG. 46 is a partial perspective view of a damaged hockey stick blade missing the tip.
Figure 47:
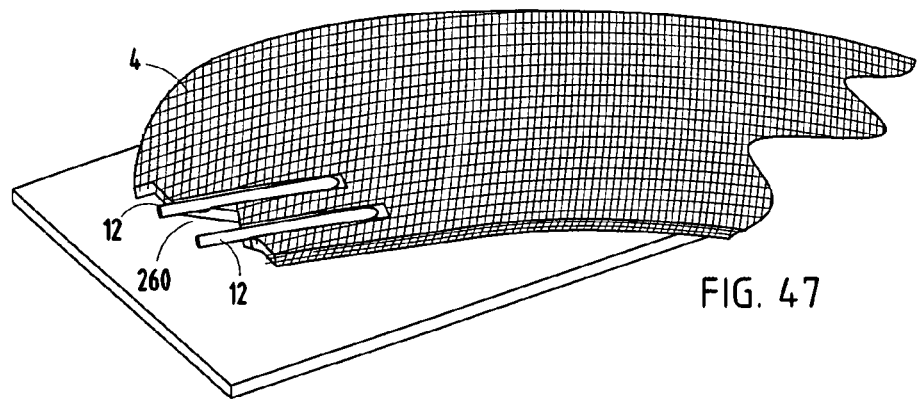
FIG. 47 is a partial perspective view of the blade of FIG. 46 with grooves and rods.
Figure 48:
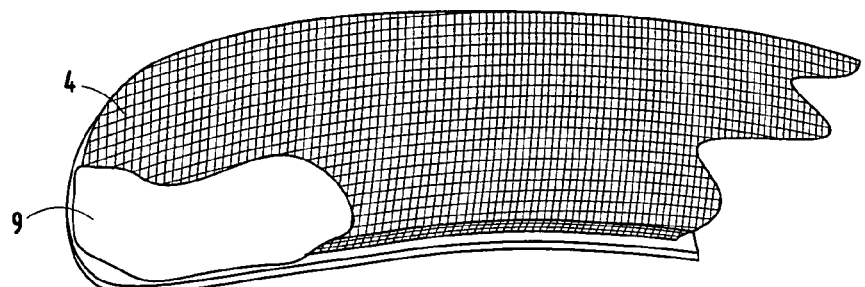
FIG. 48 is a partial perspective view of the blade of FIG. 46 with grooves and rods covered with adhesive.
Figure 49:
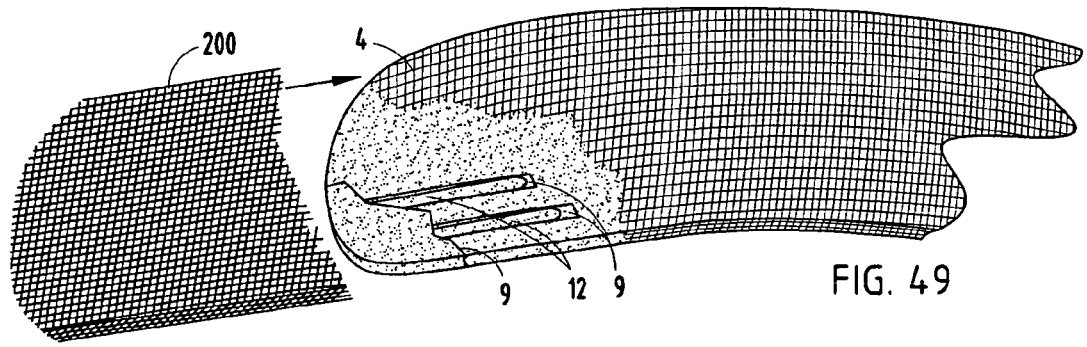
FIG. 49 is a partial perspective view of the blade of FIG. 48 after being sanded.
Figure 50:
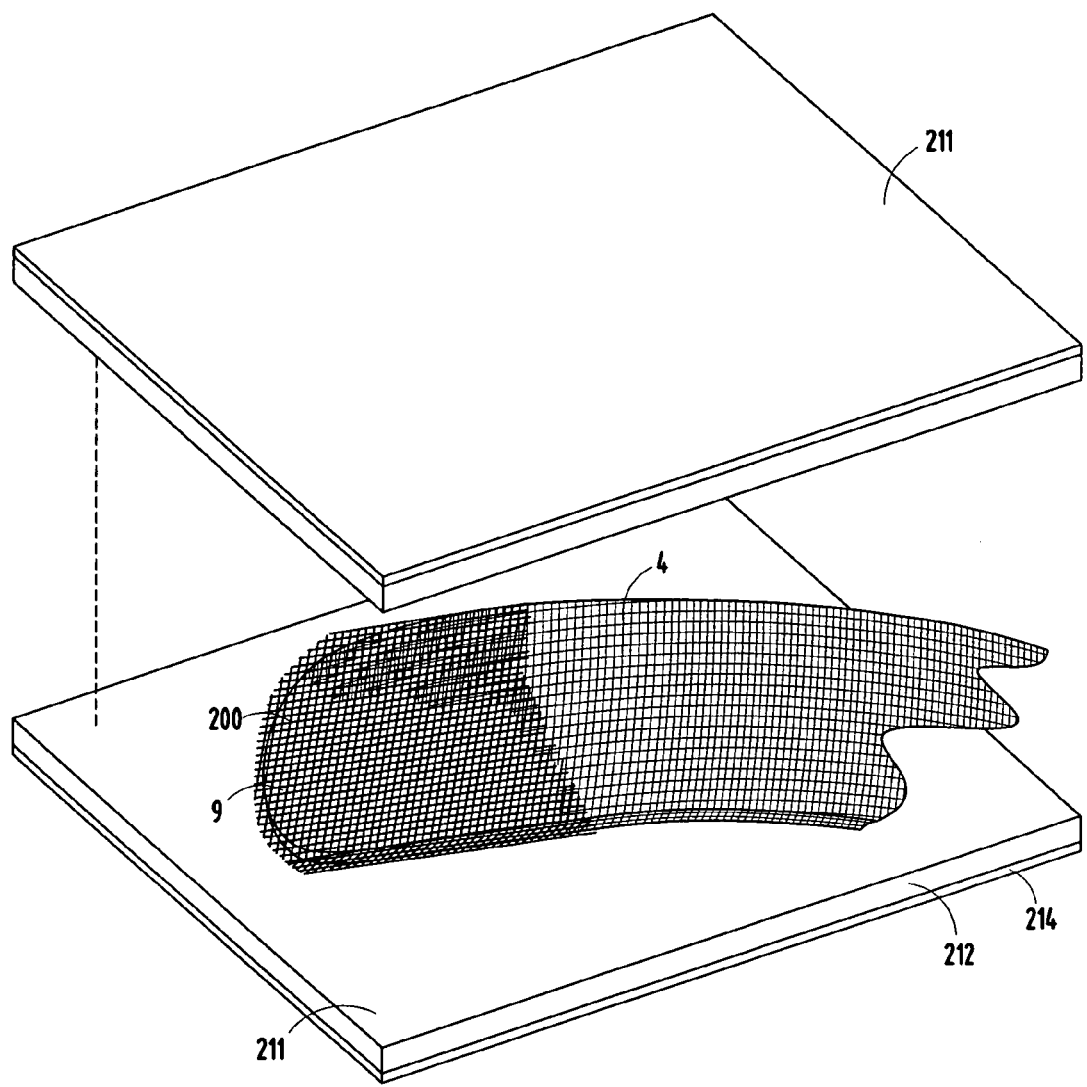
FIG. 50 is a partial perspective view of the blade of FIG. 49 after sleeving and before curing of the adhesive.

Alternatively, if only a portion 260 of a curved, thin object, such as a hockey stick blade 4, is broken off, reconstruction may be possible if the portion is lost or otherwise too damaged to be reinstalled. In this case, as shown in FIG. 46, the above method of preparing grooves 131 in the damaged area 20 is necessary. Rods 12 (as shown in FIG. 47) or wafers 100, are fitted to the grooves 131 and additional adhesive 9 is added around the rods 12 to create a shape substantially similar to the portion 260 of the blade 4 that was broken off. The adhesive 9 and blade 4 should rest on a flat or slightly curved surface 262 so that the adhesive 9 does not substantially change shape during curing. The adhesive is allowed to harden and is later sanded to conform with the shape of the missing/broken off portion of the blade 4 (FIG. 48). After sanding, adhesive 9 and sleeve 200 are added to the portion 260 (FIG. 49). Adhesive 9 is added to the sleeve 200 after the sleeve 200 covers the damaged area 20 to make sure full saturation of the sleeve 200 has occurred. The blade 4 is then secured between two compression members 211 (FIG. 50) having an inner soft layer 212 and an outer hard layer 214. The compression members 211 are placed around the sleeve 200, adhesive 9 and blade 4 and clamps 121 are applied to the outer hard layer 214. The clamps 121 apply pressure to the repaired blade 4 through the soft inner layer 212. As a result, the general shape of the blade 4 as it was formed is maintained.

Figure 51:
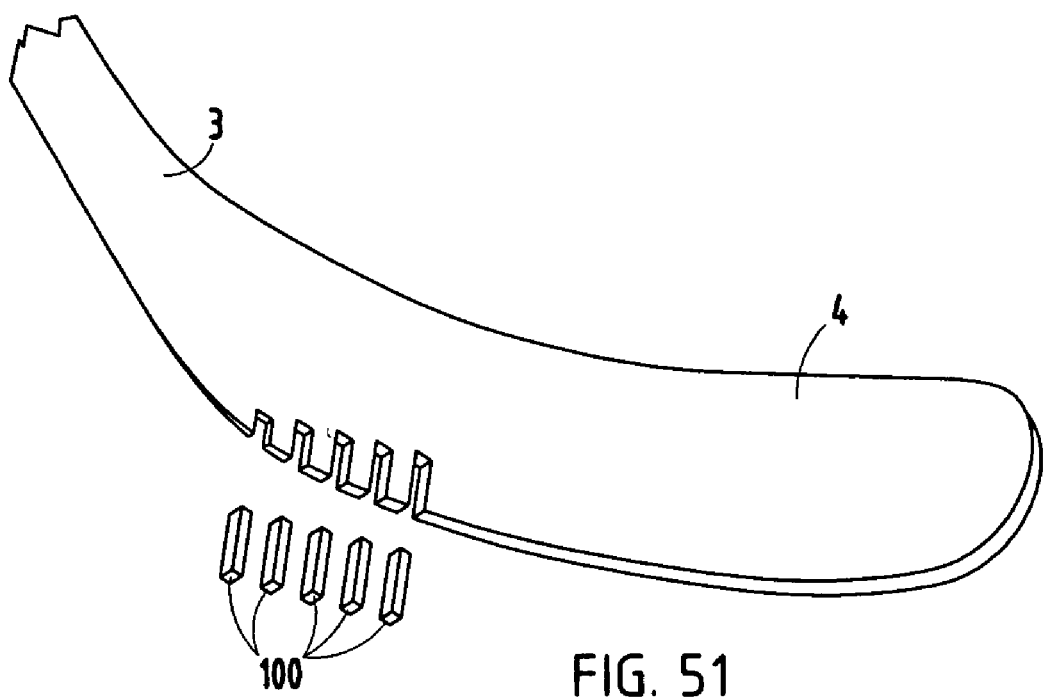
FIG. 51 is a perspective view of a blade with straight wafers installed in the heel.
Figure 52:
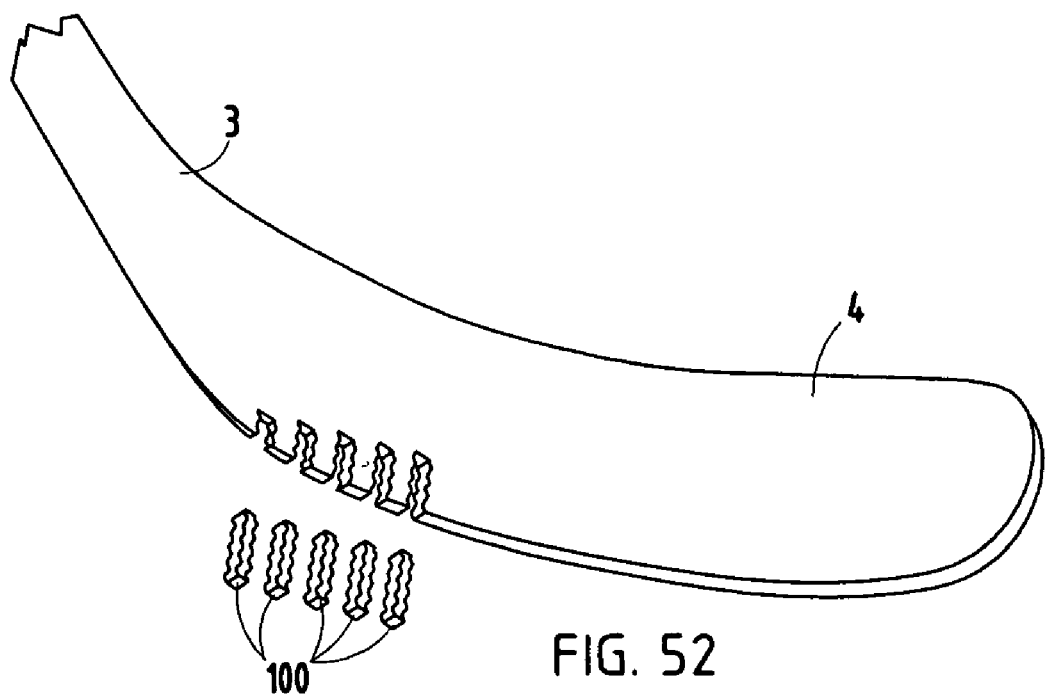
FIG. 52 is a perspective view of a blade with surface grooved wafers installed in the heel.

In a similar manner, any other external portion of a hockey stick blade 4 may be repaired. Referring to FIGS. 51 and 52, a heel portion of a hockey stick blade 4 is damaged and is therefore reinforced using either straight wafers 100 (FIG. 51) or grooved surface wafers 100 (FIG. 52).

The above-noted structural damage repair method and system may be used on any type of damaged object, including, but not limited to, hockey sticks (including blades, hozel, and shafts), boat hulls, automobiles, or any other type of object. The above-noted wafers 100 and the structural damage repair method and system restore and/or enhance the structural integrity of the repaired object resulting in less twisting and more strength of the repaired object.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A method of repairing a hollow object, comprising the steps of:
   providing a first hollow piece and a second hollow piece;
   providing a porous insert, at least a portion of which is a material external of a center section;
   positioning the insert into the first hollow piece;
   positioning the insert into the second hollow piece;
   inserting a liquid hardening system in one of the hollow pieces; and
   saturating the porous insert with the liquid hardening system.

2. The method of repairing a hollow object of claim 1, and further comprising the following steps after the step of providing an insert:
   providing a plug adapted to fit into the first hollow piece and to stop flow of a liquid hardening system therein; and
   inserting the plug into the first hollow piece to a desired location therein.

3. The method of claim 1 and further comprising the step of aligning the first hollow piece with the second hollow piece after the step of positioning the insert into the second hollow piece.

4. The method of claim 1, wherein the hardening system is an epoxy.

5. The repair kit of claim 4, wherein the liquid hardening system comprises one or more epoxies consisting of the group of bisphenol-A epoxy, bisphenol-F epoxy, and mercaptan-based epoxy.

6. The method of claim 1, wherein the center section is an open-cell foam.

7. The method of claim 1 and further comprising the step of creating grooves in the interior of the first hollow piece of the object after the step of providing an insert.

8. The method of claim 1 and further comprising the step of creating grooves in the interior of the second hollow piece of the object after the step of providing an insert.

9. The method of claim 7 and further comprising the step of creating grooves in the interior of the second hollow piece of the object after the step of providing an insert.

10. A method of repairing a hollow object, comprising the steps of:
providing a first hollow piece and a second hollow piece;
providing a porous insert, at least a portion of which is a material external of a center section;
providing a bracket system for holding the first hollow piece and second hollow piece in place;
inserting the first hollow piece and the second hollow piece into the bracket system;
aligning the first hollow piece with the second hollow piece;
positioning the insert into the first hollow piece;
positioning the insert into the second hollow piece; and
inserting a hardening system in one of the hollow pieces to saturate the porous insert.

11. A method of repairing a hollow object, comprising:
removing a damaged portion of the hollow object;
inserting a foam plug into the hollow object;
inserting a plurality of cylindrical reinforcing members into the hollow object; and
applying adhesive over the cylindrical reinforcing members.

12. The method of claim 11, wherein the method further comprises:
capping a top portion of the reinforcing members.

13. The method of claim 12, wherein the method further comprises:
wrapping tape around the hollow object.

14. The method of claim 11, wherein:
the cylindrical reinforcing member is a hollow carbon-fiber rod.

15. The method of claim 12, wherein the method further comprises:
placing a sleeve and adhesive around the hollow object.

16. The method of claim 15, wherein the method further comprises:
sanding the sleeve and adhesive around the hollow object.

17. A method of repairing a hollow object, comprising:
providing an object with a first hollow portion and a second hollow portion, the first hollow portion having a first end;
inserting a plug into the first end of the first hollow portion;
inserting a plurality of reinforcing members into the first hollow portion, adjacent the plug, the reinforcing members positioned so that the reinforcing members extend beyond the first end of the first hollow object;
placing the second hollow portion over the reinforcing members and to abut the first hollow portion; and
inserting adhesive into the second hollow portion into contact with the reinforcing members.

18. The method of claim 17, wherein the method further comprises:
wrapping tape around the hollow object.

19. The method of claim 17, wherein:
the reinforcing members are cylindrical.

20. The method of claim 18, wherein:
the cylindrical reinforcing member is a hollow carbon-fiber rod.

* * * * *